US010794932B2

(12) United States Patent
She et al.

(10) Patent No.: US 10,794,932 B2
(45) Date of Patent: Oct. 6, 2020

(54) BIOSENSOR FOR THE DETECTION OF A BIOLOGICAL TARGET, AND METHOD FOR MANUFACTURING THE SAME

(71) Applicants: The Governing Council of The University of Toronto, Toronto, Ontario (CA); Her Majesty The Queen in Right of Canada, as Represented by The Minster of National Defense, Ottawa, Ontario (CA)

(72) Inventors: Zhe She, Scarborough (CA); Kristin Topping, Ottawa (CA); Heinz-Bernhard Kraatz, Pickering (CA)

(73) Assignees: Her Majesty the Queen in Right of Canada, as Represented by The Minster of National Defense, Ottawa, Ontario (CA); The Governing Council of the University of Toronto, Toronto, Ontario (CA)

( * ) Notice: Subject to any disclaimer, the term of this patent is extended or adjusted under 35 U.S.C. 154(b) by 40 days.

(21) Appl. No.: 16/328,247

(22) PCT Filed: Aug. 29, 2017

(86) PCT No.: PCT/CA2017/051014
§ 371 (c)(1),
(2) Date: Feb. 25, 2019

(87) PCT Pub. No.: WO2018/039786
PCT Pub. Date: Mar. 8, 2018

(65) Prior Publication Data
US 2020/0225262 A1 Jul. 16, 2020

Related U.S. Application Data

(60) Provisional application No. 62/417,731, filed on Nov. 4, 2016, provisional application No. 62/380,674, filed on Aug. 29, 2016.

(51) Int. Cl.
*G01Q 30/20* (2010.01)
*G01Q 60/60* (2010.01)

(52) U.S. Cl.
CPC ............. *G01Q 30/20* (2013.01); *G01Q 60/60* (2013.01)

(58) Field of Classification Search
CPC .............................. G01Q 30/20; G01Q 60/60
(Continued)

(56) References Cited

U.S. PATENT DOCUMENTS 5,866,321 A 2/1999 Matsue et al.
6,306,589 B1 10/2001 Müller et al.
(Continued)

OTHER PUBLICATIONS

Hauquier et al. (2008) "Conducting Ferrocene Monolayers on Nonconducting Surfaces" J. Am. Chem. Soc. 130(9): 2748-2749.
(Continued)

*Primary Examiner* — Nicole M Ippolito
(74) *Attorney, Agent, or Firm* — Edward J. Baba; Bozicevic, Field & Francis LLP

(57) ABSTRACT

A substrate for the detection of a biological target by Scanning Electrochemical Microscopy (SECM) is provided. The substrate includes: a conductive surface; a probe area provided on the conductive surface, the probe area comprising receptors responsive to the biological target; and a background area provided on the conductive surface, the background area being disposed around the probe area and comprising electroactive compounds providing imaging contrast between the background area and the probe area.

24 Claims, 19 Drawing Sheets

(58) Field of Classification Search
USPC .......................................................... 850/18
See application file for complete search history.

(56) References Cited

U.S. PATENT DOCUMENTS

| | | |
|---|---|---|
| 7,223,609 B2 | 5/2007 | Anvar et al. |
| 2006/0057587 A1 | 3/2006 | Vacha et al. |
| 2007/0167814 A1* | 7/2007 | Wakabayashi ........... A61B 8/12 |
| | | 600/459 |
| 2007/0196819 A1 | 8/2007 | Asberg et al. |
| 2012/0190040 A1* | 7/2012 | Talebpour ......... B01L 3/502715 |
| | | 435/7.1 |
| 2014/0248654 A1* | 9/2014 | Urano .................. C07D 405/14 |
| | | 435/29 |
| 2015/0018232 A1 | 1/2015 | Furst et al. |

OTHER PUBLICATIONS

International Search Report and Written Opinion; No. PCT/CA2017/051014; dated Dec. 5, 2017.
Wang et al. (2015) "Clickable 5'-y-Ferrocenyle Adenosine Triphosphate Bioconjugates in Kinase-Catalyzed Phosphorylations" Chem. Eur. J. 21: 4988-4999.

* cited by examiner

Scheme 1.

BIOSENSOR FOR THE DETECTION OF A BIOLOGICAL TARGET, AND METHOD FOR MANUFACTURING THE SAME

TECHNICAL FIELD

The technical field generally relates to the detection of pathogens, and more particularly to the electrochemical detection of pathogens on a solid support.

BACKGROUND

In recent years, biosensors for the detection of pathogens have been developed. Most of these biosensors focus on the recognition of one particular strain of pathogens. This can be useful for identifying a specific strain and then decide on a proper treatment to be administered to a patient. However, detecting one particular strain of pathogens may not be suited for an overall monitoring of pathogens in an open environment (e.g., monitoring of pathogens in water such as lake water or drinking water), because more than one strain of pathogens may be present.

In view of the above, many challenges still exist in the field of pathogen detection.

SUMMARY

In some embodiments, there is provided a substrate for the detection of a biological target by Scanning Electrochemical Microscopy (SECM), comprising: a conductive surface; a probe area provided on the conductive surface, the probe area comprising receptors responsive to the biological target; and a background area provided on the conductive surface, the background area being disposed around the probe area and comprising electroactive compounds providing imaging contrast between the background area and the probe area.

In some embodiments, the conductive surface is a gold surface or a carbon surface.

In some embodiments, the conductive surface is a gold surface.

In some embodiments, the electroactive compounds comprise a metal complex.

In some embodiments, the metal complex is a sandwich metal complex.

In some embodiments, the sandwich metal complex is a metallocene.

In some embodiments, the metallocene is a ferrocene.

In some embodiments, the electroactive compounds are provided on the background area at a surface density between 1 molecule/nm$^2$ to 10 molecules/nm$^2$.

In some embodiments, the substrate further includes a linker layer provided on the conductive surface, wherein: the linker layer connects the receptors to the conductive surface in the probe area, and the linker layer connects the electroactive compounds to the conductive surface in the background area.

In some embodiments, the linker layer is made of linkers comprising: a substrate moiety bound to the conductive surface, and a ligand attachment moiety bound to the receptors or the electroactive compounds.

In some embodiments, the substrate moiety comprises a sulfur-bearing functional group.

In some embodiments, the sulfur-bearing functional group is a thiol, a sulfide or a disulfide.

In some embodiments, the ligand attachment moiety comprises an activated carboxylic acid.

In some embodiments, the substrate further includes a blocker compound for blocking unreacted ligand attachment moieties.

In some embodiments, the blocker compound comprises ethanolamine.

In some embodiments, the receptors comprise at least one type of Toll-like receptors (TLRs).

In some embodiments, the receptors are selected from the group consisting of TLR-1, TLR-2, TLR-3, TLR-4, TLR-5, TLR-6 and combinations thereof.

In some embodiments, the receptors comprise heterodimers of TLR receptors.

In some embodiments, the heterodimers of TLR receptors are selected from the group consisting of TLR-1/TLR-2 heterodimers and TLR-2/TLR-6 heterodimers.

In some embodiments, the probe area comprises a plurality of spots, each of the spots being at least partially surrounded by the background area.

In some embodiments, each of the spots is wholly surrounded by the background area.

In some embodiments, the plurality of spots is an array of spots.

In some embodiments, the plurality of spots is divided into groups of spots, each group of spots being provided with a distinct type of receptor.

In some embodiments, there is provided a biosensor for detecting a biological target by SECM, comprising the substrate as defined herein, and an electrode for applying a potential to the probe area and the background area.

In some embodiments, there is provided a method for manufacturing a substrate for conducting SECM measurements, the method comprising: providing a conductive surface; attaching receptors to a first area of the conductive surface to obtain a probe area, the receptors being responsive to a biological target; and attaching electroactive compounds to a second area of the conductive surface located around the first area to obtain a background area, the electroactive compounds providing imaging contrast between the background area and the probe area.

In some embodiments, the conductive surface is a gold surface or a carbon surface.

In some embodiments, the conductive surface is a gold surface.

In some embodiments, the electroactive compounds comprise a metal complex.

In some embodiments, the metal complex is a sandwich metal complex.

In some embodiments, the sandwich metal complex is a metallocene.

In some embodiments, the metallocene is a ferrocene.

In some embodiments, the electroactive compounds are attached to the second area at a surface density between 1 molecule/nm$^2$ to 10 molecules/nm$^2$.

In some embodiments, the method further includes binding linkers to the conductive surface to obtain a linker layer, wherein: attaching the receptors to the first area of the conductive surface comprises binding the receptors to the linker layer; and attaching the electroactive compounds to the second area of the conductive surface comprises binding the electroactive compounds to the linker layer.

In some embodiments, binding the linkers to the conductive surface comprises: binding a substrate moiety of the linkers to the conductive surface; and binding a ligand attachment moiety of the linkers to the receptors in the first area, and to the electroactive compounds in the second area.

In some embodiments, the substrate moiety comprises a sulfur-bearing functional group.

In some embodiments, the sulfur-bearing functional group is a thiol, a sulfide or a disulfide.

In some embodiments, the method further includes binding a blocker compound to unreacted ligand attachment moieties to block the unreacted ligand attachment moieties.

In some embodiments, the blocker compound comprises ethanolamine.

In some embodiments, the receptors comprise at least one type of Toll-like receptors (TLRs).

In some embodiments, the receptors are selected from the group consisting of TLR-1, TLR-2, TLR-3, TLR-4, TLR-5, TLR-6 and combinations thereof.

In some embodiments, the receptors comprise heterodimers of TLRs.

In some embodiments, the heterodimers of TLRs are selected from the group consisting of TLR-1/TLR-2 heterodimers and TLR-2/TLR-6 heterodimers.

In some embodiments, the probe area comprises a plurality of spots, each of the spots being at least partially surrounded by the background area.

In some embodiments, each of the spots is wholly surrounded by the background area.

In some embodiments, the plurality of spots is an array of spots.

In some embodiments, the plurality of spots comprises groups of spots, each group of spots being provided with a distinct type of receptor.

A substrate for the detection of a biological target by Scanning Electrochemical Microscopy (SECM) is provided. The substrate includes: ma surface; a probe area provided on the surface, the probe area comprising detectors responsive to the biological target; and a background area provided on the surface, the background area being disposed around the probe area and comprising an electroactive compound providing imaging contrast between the background area and the probe area.

A biosensor for detecting a biological target by SECM is provided. The biosensor includes: a substrate comprising: a surface; a probe area provided on the surface, the probe area comprising detectors responsive to the biological target; and a background area provided on the surface, the background area being disposed around the probe area and comprising an electroactive compound providing imaging contrast between the background area and the probe area; and an electrode for applying a potential to the probe area and the background area.

A substrate for the detection of a biological target by SECM is provided. The substrate includes: a surface; a linker layer of bifunctional linkers provided on the surface, the bifunctional linkers comprising: a substrate moiety bound to the surface; and a ligand attachment moiety, a probe layer provided on a first area of the linker layer, the probe layer comprising detectors bound to the ligand attachment moiety, the detectors being responsive to the biological target; and a background layer provided on a second area of the linker layer, the background layer surrounding or disposed around the probe layer and comprising an electroactive compound bound to the ligand attachment moiety, the electroactive compound providing imaging contrast between the background layer and the probe layer.

A biosensor for detecting a biological target by SECM is provided. The biosensor includes: a substrate comprising: a surface; a linker layer of bifunctional linkers provided on the surface, the bifunctional linkers comprising: a substrate moiety bound to the surface; and a ligand attachment moiety, a probe layer provided on a first area of the linker layer, the probe layer comprising detectors bound to the ligand attachment moiety, the detectors being responsive to the species; and a background layer provided on a second area of the linker layer, the background layer disposed around or surrounding the probe layer and comprising an electroactive compound bound to the ligand attachment moiety, the electroactive compound providing imaging contrast between the background layer and the probe layer, and an electrode for applying a potential to the probe layer and the background layer.

A method for manufacturing a substrate for conducting SECM measurements is provided, the method including: providing a substrate having a surface; binding bifunctional linkers to the surface, thereby obtaining a linker layer, the bifunctional linkers comprising: a substrate moiety bound to the surface; and a ligand attachment moiety; on a first area of the linker layer: binding detectors to the ligand attachment moiety of the bifunctional linkers, thereby obtaining a probe layer; and on a second area of the linker layer: binding an electroactive compound to the ligand attachment moiety of the bifunctional linkers, thereby obtaining a background layer, the electroactive compound providing imaging contrast between the background layer and the probe layer.

A biosensor array for pathogen detection is provided, the biosensor including: a surface; and a plurality of Toll Like Receptor (TLR) molecules provided on the surface wherein the plurality of TLR molecules comprises at least two distinct TLR molecules.

The use of the biosensor as described herein is provided, for differentiating biological species.

The Use of the biosensor as described herein is provided, for whole cell pathogen detection.

A method for identifying a biological target is provided, the method including: recording a response of a biosensor array prior to and after exposure of the biosensor to a sample comprising the biological target, in order to obtain a global response of the biosensor array; identifying the biological target by comparison of the global response of the biosensor array to a reference response of the biological target, wherein the biosensor array comprises a plurality of Toll Like Receptor (TLR) molecules provided on the surface, the plurality of TLR molecules comprising at least two distinct TLR molecules.

BRIEF DESCRIPTION OF THE DRAWINGS

FIG. 4a is an SECM image of four TLR5 spots;

FIG. 4b is a cross-section profile of line b) as shown in FIG. 4a;

FIG. 4c is a 3D illustration of the feedback modes of the TLR5 spots and ferrocene background;

DESCRIPTION

Figure 1:
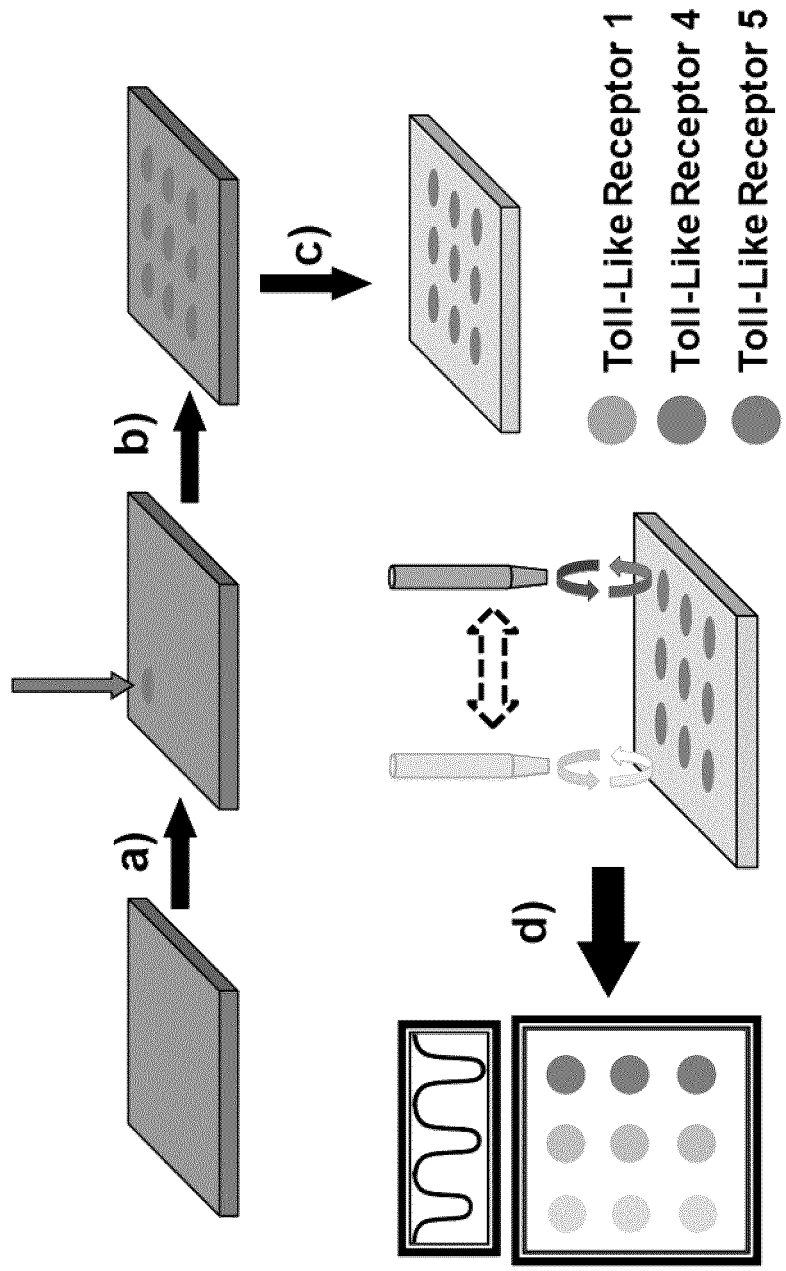
FIG. 1 is a schematic representation of a method of manufacturing a biosensor and detecting a biological target.

The materials and methods described herein relate to the detection of a biological target using electrochemical techniques. The materials and methods described herein may be used for identifying the class of a biological target (such as the class of a pathogen), and are not necessarily limited to the identification of a specific strain of pathogen.

It should be understood that the term "biological target", as used herein, refers to a substance of biological origin to be detected. Non-limiting examples of biological targets may include proteins, peptides, antibodies, toxic agents, lipids, amino acids, amines, small molecules, carbohydrates, cellular components, viruses, components of the extracellular matrix, cells, cell fragments and nucleic acids. In some scenarios, the biological target may include Pathogen-Associated Molecular Patterns (PAMPs), which can be detected by toll-like receptors (TLRs).

It should be understood that the expression "electrochemical techniques", as used herein, refers to techniques used to measure the local electrochemical behavior of a sample. Non-limiting examples of such techniques may include Scanning Electrochemical Microscopy (SECM), Square wave Voltammetry (SWV) and Electrochemical Impedance Spectroscopy (EIS).

Detection by Scanning Electrochemical Microscopy (SECM) with Contrast Agent

In some embodiments, a substrate for the detection of a biological target by Scanning Electrochemical Microscopy (SECM) is provided. The substrate includes a conductive surface onto which a probe area and a background area are provided. The background area is disposed around of the probe area. The probe area includes receptors that are responsive to the biological target, and the background area includes electroactive compounds providing imaging contrast between the background area and the probe area.

The biosensors and methods of the present description can be implemented in various SECM collection modes. In some embodiments, the SECM can be operated in feedback mode: when in a bulk solution containing a redox couple (e.g., $Fe^{2+}/Fe^{3+}$), the oxidized species is reduced at the tip of the electrode, thereby producing a steady-state current that is limited by diffusion. As the tip of the electrode approaches a conductive surface, the reduced species is oxidized, thereby increasing the tip current to generate a "positive" feedback loop. Alternatively, when the tip of the electrode approaches an insulating surface, the oxidized species is not regenerated and diffusion to the electrode is inhibited as a result of physical obstruction, thereby generating a "negative" feedback loop and decreasing the tip current. The change in tip current can be plotted as an "approach curve" (as shown for example in FIG. 2b). In other embodiments, the SECM can be operated in collection-generation mode (also called direct mode), or SECM imaging mode in which the tip current is monitored as a function of distance between electrode tip and substrate surface.

The substrate includes a conductive surface onto which receptors and electroactive compounds (such as electroactive contrast agents) can be provided. It should be understood that the term "conductive surface" as used herein, refers to a base conductive surface made of a conductive material onto which several other components of the substrate can be provided. The conductive material can be a redox-stable material such as gold, carbon (e.g., glassy carbon) or platinum. The other components can be added in various areas of the conductive surface, and can be attached to the conductive surface via electrostatic interactions, covalent bonding, ligand-metal bonding, or any other suitable intermolecular bond or interaction. While the base conductive surface is made of a conductive material as explained above, and onto which other layers are provided. It should be understood that the other layers provided on the conductive surface can be of various conductivities.

As mentioned above, a probe area and a background area are provided on the conductive surface, the background area being disposed around of the probe area. The probe area and background can be continuous areas or divided into several discrete areas (i.e., several areas that are not directly connected with one another). In some embodiments, the probe area can be provided as a plurality of discrete areas while the background area can be provided as a continuous area around the discrete areas. In other embodiments, the probe area and the background area can be disposed as two co-continuous areas on the conductive surface. It should be understood that the expression "disposed around", as used herein, refers to the background area having at least part of its edges in contact with at least part of the edges of the probe area. The probe area can therefore be at least partially surrounded, or wholly surrounded by the background area.

In some embodiments, the receptors of the probe area and the electroactive compounds of the background are can be provided directly on the conductive surface. For example, the electroactive compounds and receptors can be selected to have a functional group that can bind directly to the conductive surface. In other embodiments, the receptors and electroactive compounds are connected to the conductive surface via a linker layer that connects the receptors to the conductive surface in the probe area, and the electroactive compounds to the conductive surface in the background area. In other words, it should be understood that the expressions "probe area provided on the conductive surface" and "background area provided on the conductive surface" are meant to encompass both a direct bonding or an indirect bonding via a linker layer between the probe area and the conductive surface, and between the background area and the conductive surface.

In some embodiments, the linker layer is made of linkers, each linker including a substrate moiety for binding to the conductive surface, and a ligand attachment moiety for binding to the receptors or to the electroactive compounds depending on the area in which the linker is provided. In some embodiments, the substrate moiety includes a sulfur-bearing functional group that can bind to conductive surfaces such as gold surfaces. Non-limiting examples of sulfur-bearing functional groups include thiols, sulfides and disulfides. In some embodiments, the ligand attachment moiety includes a carboxylic acid or activated carboxylic acid that can react with an amino or hydroxy group provided on the receptors or electroactive compounds. Alternatively, the ligand attachment moiety includes an amino or hydroxy group that can react with a carboxylic acid or activated carboxylic acid provided on the receptors or electroactive compounds. For example, the linker can be a lipoic acid N-hydroxysuccinimide compound. It should be understood that the substrate moiety and ligand attachment moiety can include various functional groups, as long as the functional groups can bind to the conductive surface (for the substrate moiety) or to the electroactive compounds/receptors (for the ligand attachment moiety).

In some embodiments, a substrate further includes a blocker compound that blocks the unreacted ligand attachment moieties. For example, blocker compounds having similar reactive groups than the receptors or electroactive compounds can be contacted with the conductive surface after the receptors and electroactive surface are provided. The blocked unreacted ligand attachment moieties are thus prevented from further reacting.

In some embodiments, the electroactive compounds include a metal complex such as a sandwich metal complex, in which a metal is bound by haptic covalent bonds to two arene ligands. In some embodiments, the electroactive compounds are provided as a monolayer of electroactive compounds on the conductive surface. When the two arene ligands are cyclopentadienyl anions, the sandwich metal complex is a metallocene. When the metal of the metallocene is iron, the metallocene is a ferrocene. Functionalized electroactive compounds (such as functionalized ferrocene) can be used to react with the linkers or directly with the conductive surface. A non-limiting example of functionalized ferrocene includes 2-aminoethylferrocenylmethyl ether.

The electroactive compounds provide imaging contrast between the background area and the probe area when performing an SECM measurement. In other words, providing electroactive compounds on a conductive surface in a background area changes the background signal to a point where the signal from the probe area is readily distinguishable from the background signal. It should be understood that the expression "providing imaging contrast" as used herein, refers to the ability to distinguish between differences in signal intensity between the background area and the probe area. This can be seen, for example, in FIG. 5: imaging contrast is provided at FIGS. 5a and 5b (where ferrocene is provided on the background area) while no imaging contrast is provided a FIG. 5e (where no ferrocene is provided on the background area).

The electroactive compounds can be provided on the background area at various surface densities. For example, the electroactive compound can be provided at a surface density between 1 molecule/nm$^2$ and 10 molecule/nm$^2$, or between 3 molecule/nm$^2$ and 7 molecule/nm$^2$, or between 5 molecule/nm$^2$ and 6 molecule/nm$^2$.

As a non-limiting example, a biosensor using TLRs (as receptors) for detecting PAMPs (as biological targets) and using a ferrocene-based compound (as the electroactive compounds) for providing imaging contrast is described below. It should be understood that biosensors using other receptors, biological targets and/or electroactive compounds may be used.

TLRs have been known to target particular PAMPs, such as lipopeptides, lipopolysaccharide, double-stranded RNA and lipopolysaccharide, rather than a specific type of pathogen strain. The detection ability can be custom tuned by selecting a specific combination of TLRs, for use as detectors. A plurality of TLRs can be used to fingerprint different pathogens and recognize them when their fingerprint is compared to a database.

For example, a list of the different TLRs and their targets is described in the book entitled Target Pattern Recognition in Innate Immunity (Advances in experimental medicine and biology, volume 653, Uday Kishore, Springer Science & Business Media, 2010), which is incorporated herein by reference in its entirety.

Examples of TLRs and their targets are shown in Table 1 below.

TABLE 1

Pathogen derived ligands for TLRs

| Receptor | Ligand | Origin of Ligand |
| --- | --- | --- |
| TLR1/TLR2 | Triacyl lipopetide | Bacteria |
| TLR2 | Lipoprotein/lipopetide | Various pathogens |
| | Peptidoglcycan | Gram-positive bacteria |
| | Lipoteichoic acid | Gram-negative bacteria |
| | Glycoinositol phospholipids | Trypanosoma cruzi |
| | Atypical lipopolysaccharide | Legionella, Leptospira, |
| | Zymosan | Porphyromonas, |
| | Hemagglutinin | Fungi |
| | Structural viral proteins | Measles virus |
| | Glycoinositolphospholipid | CMV, HSV |
| | | Trypanosoma cruzi |
| TLR3 | Double-stranded RNA | Viruses |
| TLR4 | Lipopolysaccharide | Gram-negative bacteria |
| | Zymosan | Fungi |
| | Fusion protein | Respiratory syncytial virus |
| | Envelope protein | Mouse mammary-tumour virus |

TABLE 1-continued

Pathogen derived ligands for TLRs

| Receptor | Ligand | Origin of Ligand |
| --- | --- | --- |
| TLR5 | Flagellin | Bacteria |
| TLR6/TLR2 | Diacyl lipopetides | Mycoplasma |
| TLR7 | Imidazoquinoline | Synthetic compounds |
| | Loxoribine | Synthetic compounds |
| | Single-stranded RNA | Viruses |
| TLR8 | Imidazoquinoline | Synthetic compounds |
| | Single-stranded RNA | Viruses |
| TLR9 | CpG-containing DNA | Bacteria, viruses |
| | Hemozoin | Plasmodium |
| TLR11 | Profilin | Toxoplasma gondii, uropath. bacteria |

In order to create a more functional bio-recognition sensor towards pathogen screening, distinct TLRs may be used to provide a plurality of binding sites. By monitoring electrochemical signals from distinct TLRs, certain classes of pathogens or PAMPs may be screened. For example, TLR1, TLR4 and TLR5 are known to recognize bacterial PAMPs of lipopeptides, lipopolysaccharide and flagellins, respectively. This may be used for targeting bacterial pathogens. TLRs multiplex biosensors were prepared for detecting signals from each TLR on the same electrode surface.

In some embodiments, the receptors can include at least one type of TLR, such as TLR1, TLR2, TLR3, TLR4, TLR5, TLR6 or combinations thereof. In some embodiments, the receptors can include heterodimers of TLRs (or hybridized TLRs), such as TLR1/TLR2 heterodimers or TLR2/TLR6 heterodimers. The heterodimers of TLRs can be either prepared in solution prior to being provided on the conductive surface, or formed in situ by providing a first TLR on the conductive surface, and providing a second TLR that can bind on the first TLR that is already attached to the conductive surface. In some scenarios, and as shown in the examples below, sensors using hybridized TLRs can have a higher electrochemical response than sensors using non-hybridized TLRs.

SECM can provide two-dimensional imaging of electrode surfaces. In order to enhance the contrast between the TLRs and the background, a conducting monolayer of ferrocene derivatives was bound to the surface of the background. The bound ferrocene derivatives can induce a positive feedback, similarly to a conductive surface, as will be shown in the Examples section.

Figure 3:
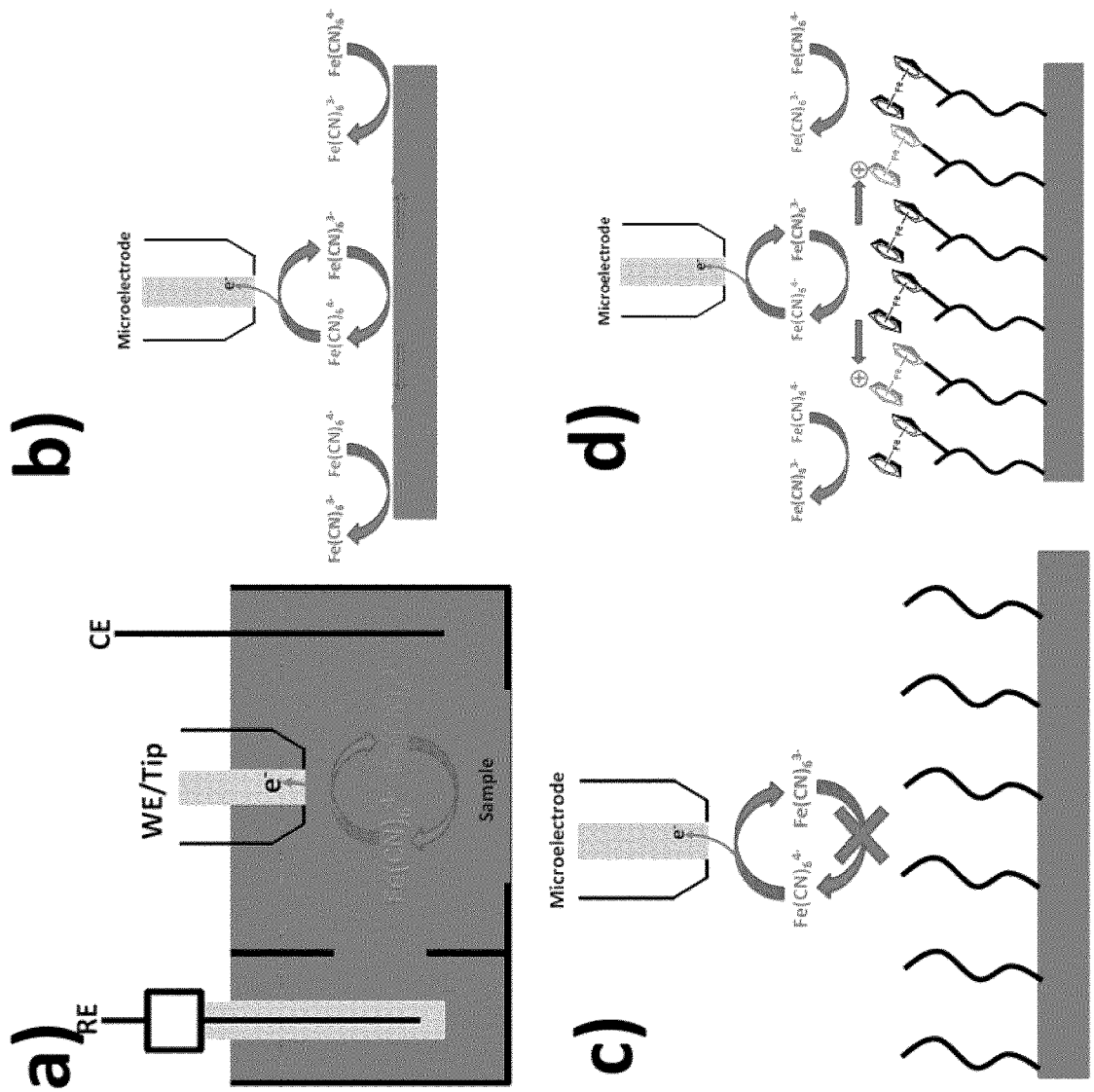
FIG. 3 is a schematic representation illustrating the Scanning Electrochemical Microscopy (SECM) setup.

Captions for Figures:

FIG. 3: (a) Illustration of Scanning Electrochemical Microscopy setup, mechanisms of (b) positive current feedback on bare gold surfaces, (c) negative current feedback on gold surface modified with LPA and (d) positive current feedback on gold modified with LPA and Fc.

Figure 4:
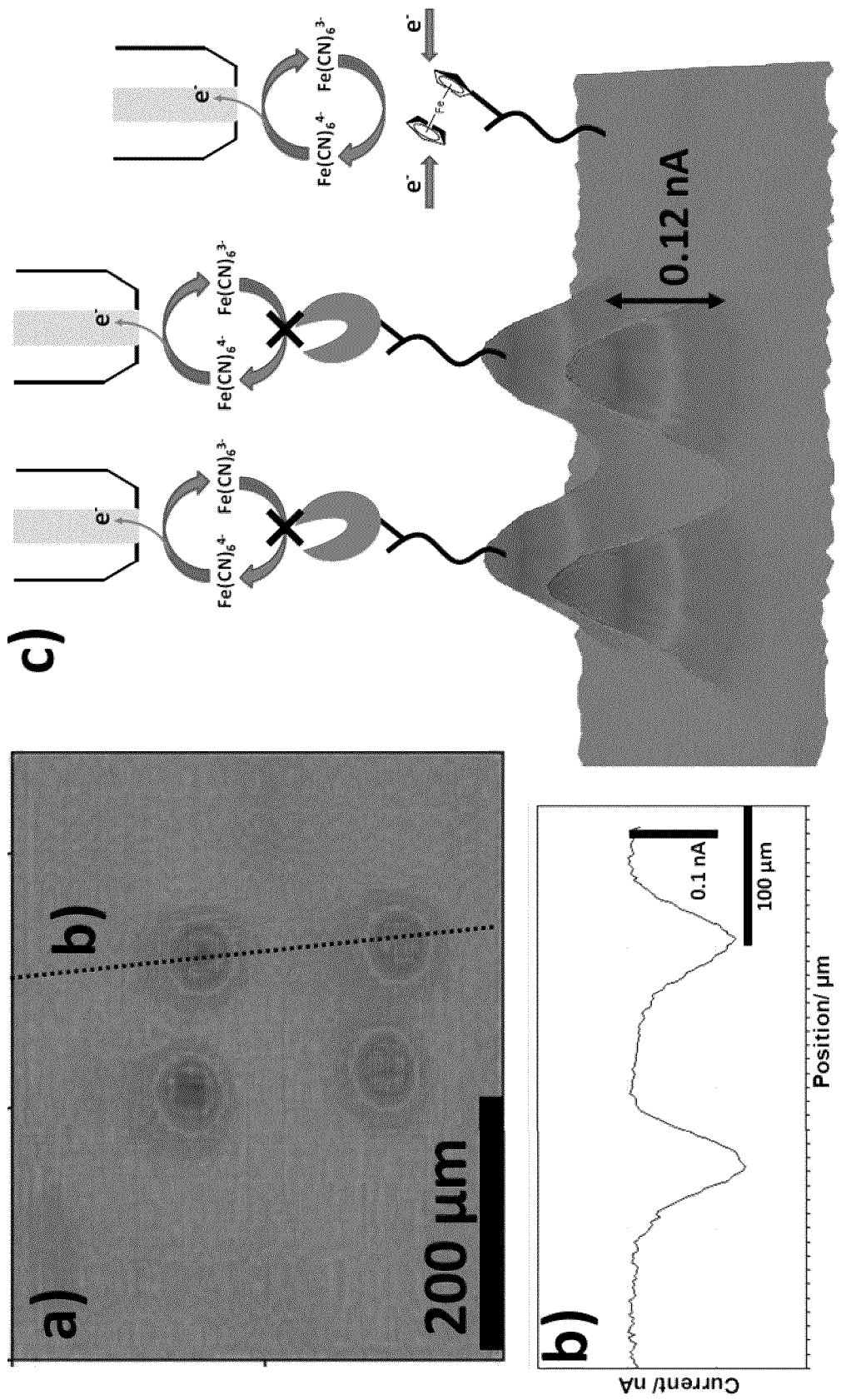

FIG. 4: a) SECM image of 4 TLR5 spots; b) cross-section profile of indicated line in a); c) 3D illustration of the feedback modes of TLR5 and Fc background.

Figure 5:
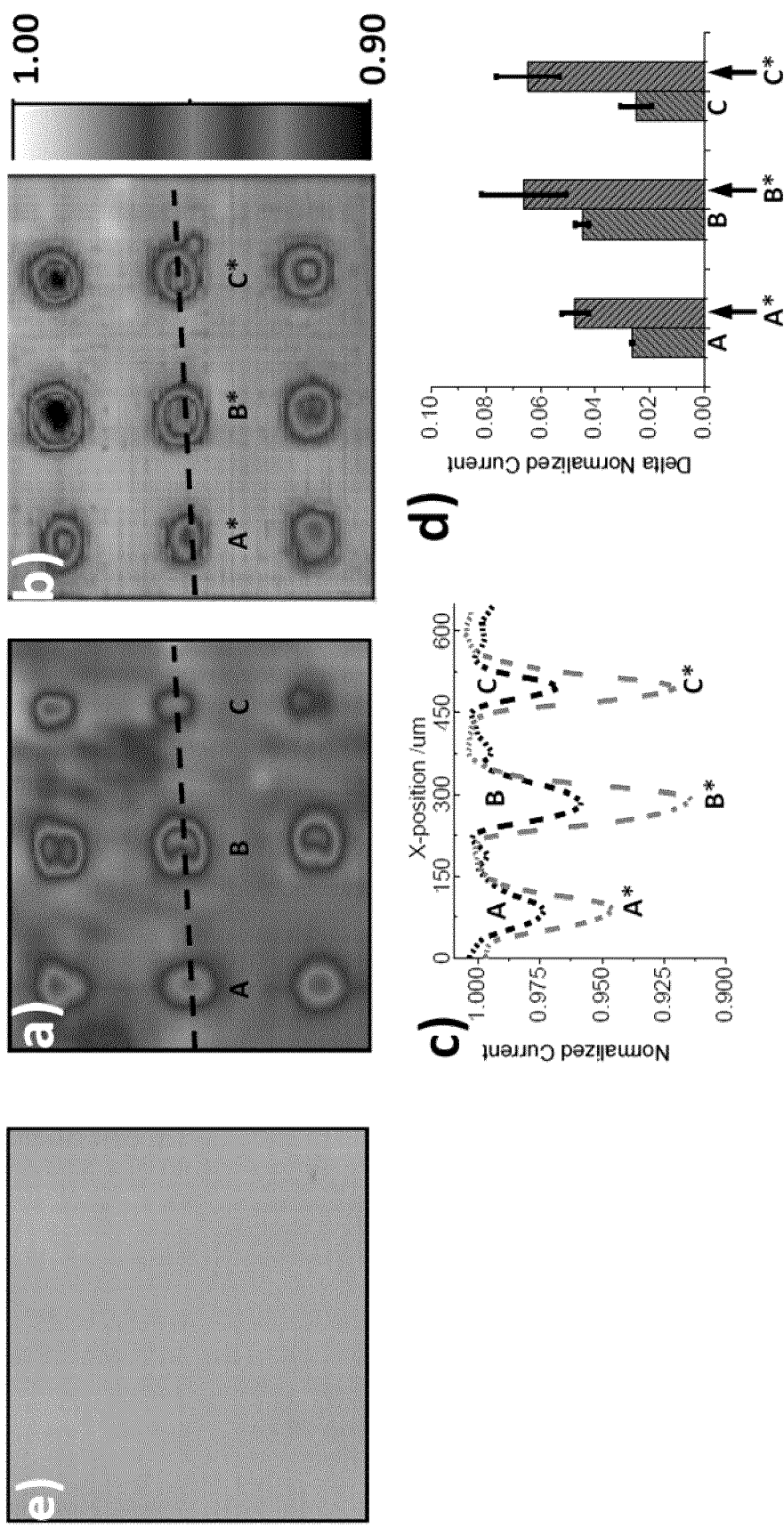
FIG. 5a is an SECM image of a microarray having nine TLR spots and having a ferrocene background.
FIG. 5b is an SECM image of a microarray having nine TLR spots exposed to *E. coli* K12, and having a ferrocene background.
FIG. 5c is a cross-section profile of lines A-B-C and A*-B*-C* shown on FIGS. 5a and 5b, respectively.
FIG. 5d is a plot showing the differences between the spots and the background in normalized current mode.
FIG. 5e is an SECM image of a microarray having TLR spots but no ferrocene background.

FIG. 5: Current normalized (z-axis) SECM images of microarrays of a) TLRs only and b) TLRs+K12. The label of A, B and C are corresponding to TLR1, TLR4, TLR5 and * represent TLRs spots with K12. c) cross-section profile of the indicated lines in a) and b). d) The differences between the spot and the background in normalized current. e) TLR but no Ferrocene background.

Figure 7:
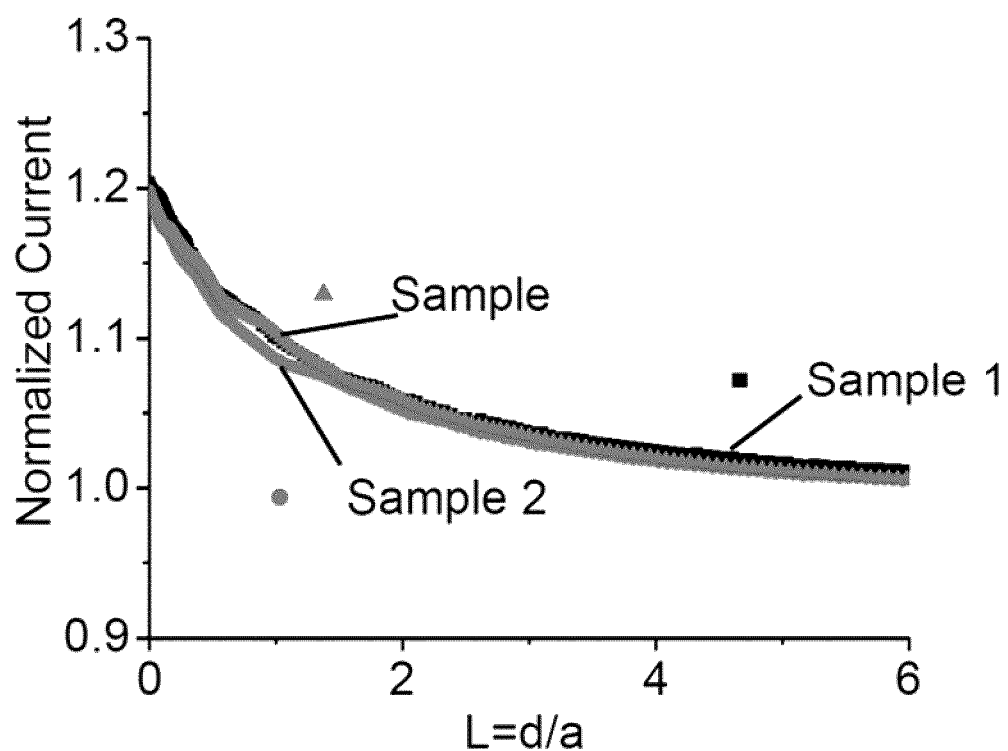
FIG. 7 is a plot showing the approach curves obtained from three samples of surfaces modified with aminoferreocene.

FIG. 7: Three approach curves obtained from 3 samples of surfaces modified with aminoferrocene.

Figure 8:
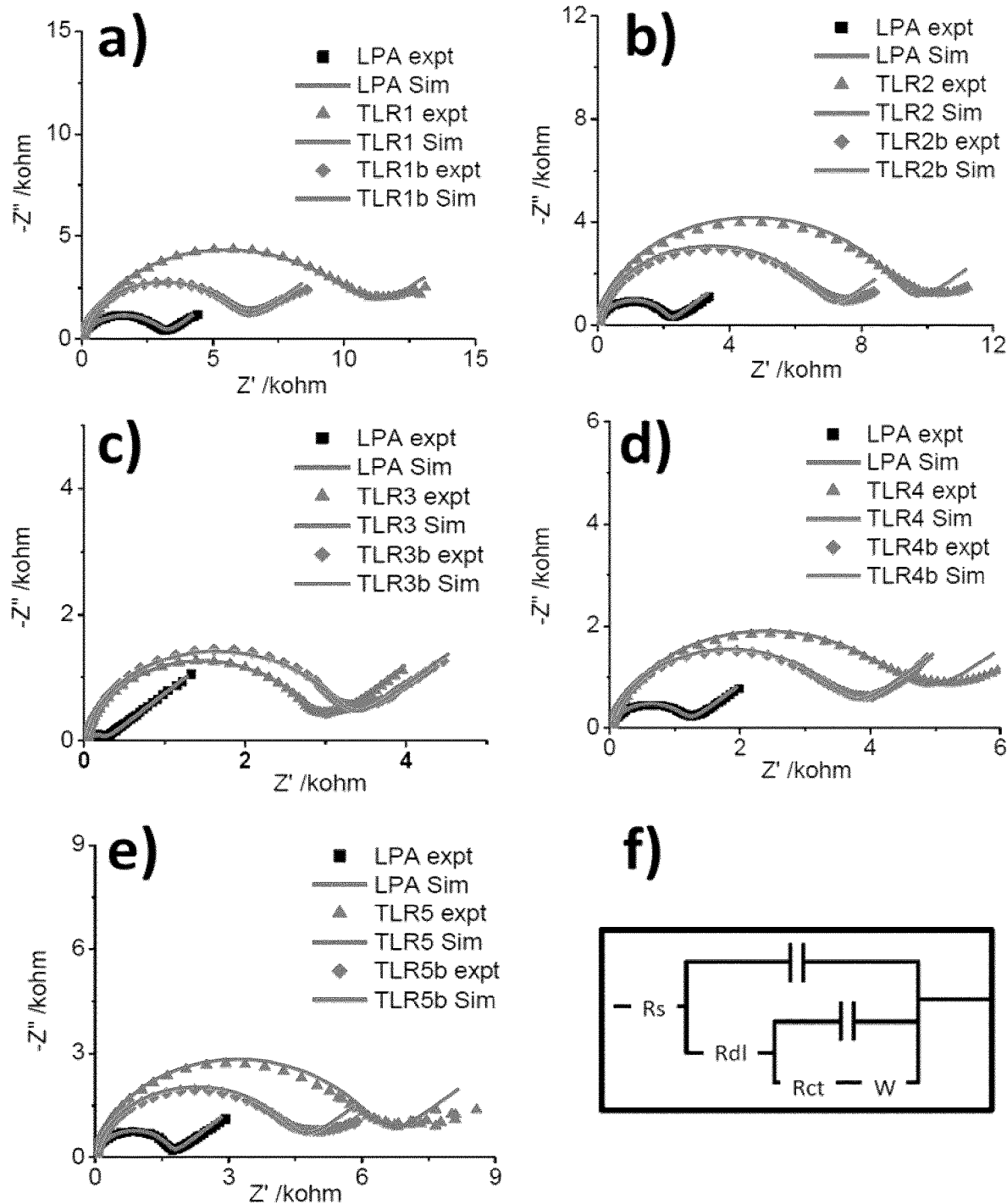
FIG. 8 is a series of plots showing impedance measurement plots for TLR1 (FIG. 8a), TLR2 (FIG. 8b), TLR3 (FIG. 8c), TLR4 (FIG. 8d) and TLR5 (FIG. 8e), fitted with the model shown at FIG. 8f to evaluate film resistance Rct.

FIG. 8: Preparation and characterization of TLR biosensors. (a) TLR1, (b) TLR2, (c) TLR3, (d) TLR4, and (e) TLR5. Electrochemical impedance measurement was carried out after each building step, Modification with linker molecule LPA, attachment of TLR protein and blocking the background. The scatters are experimental data, which is fitted with model shown in (f) to evaluate the film resistance Rct.

Figure 9:
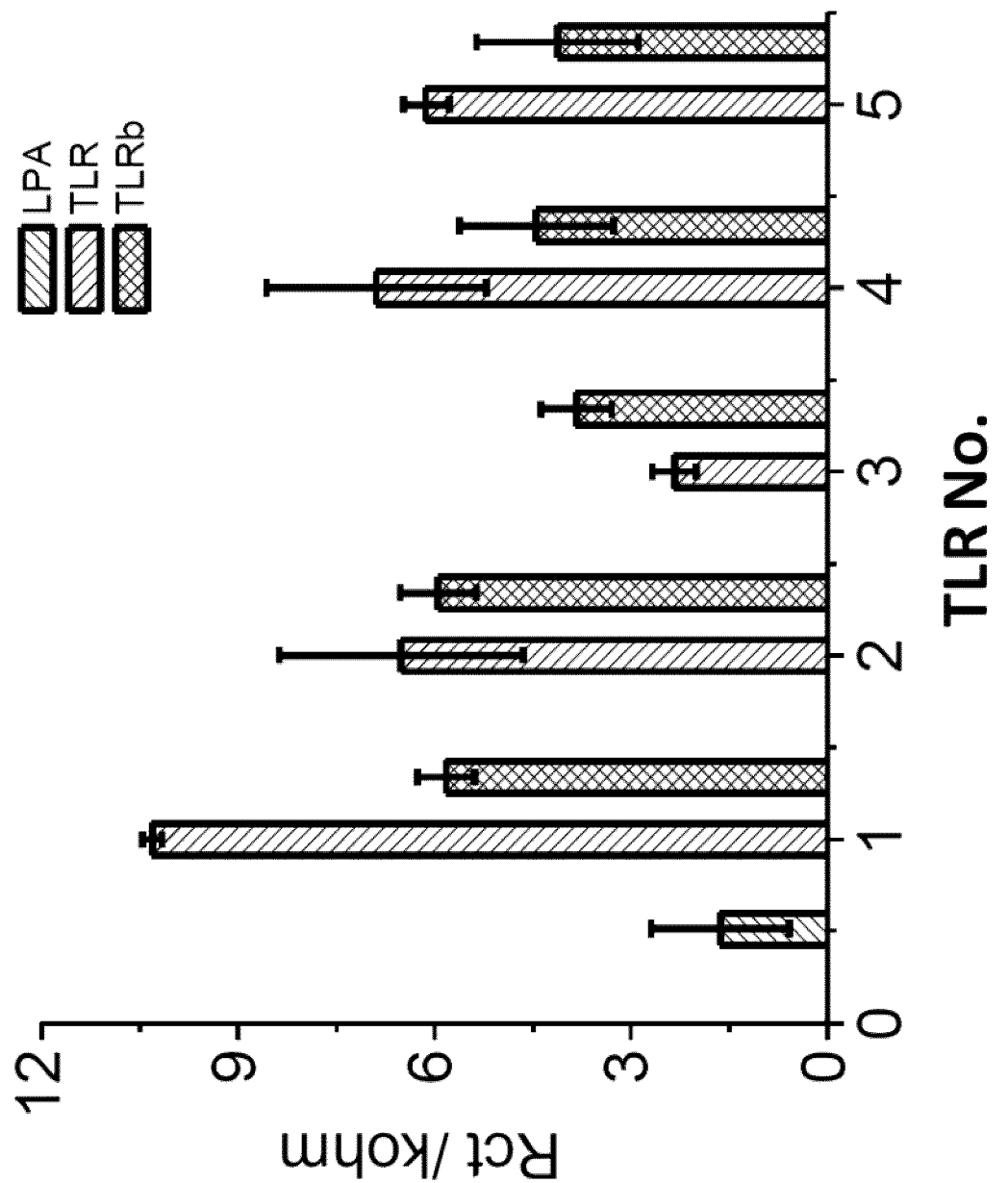
FIG. 9 is a plot showing the Rct values obtained using the model of FIG. 8f.

FIG. 9: Statistical plot of Rct, film resistance, measured after each modification step towards building TLR sensor.

Figure 10:
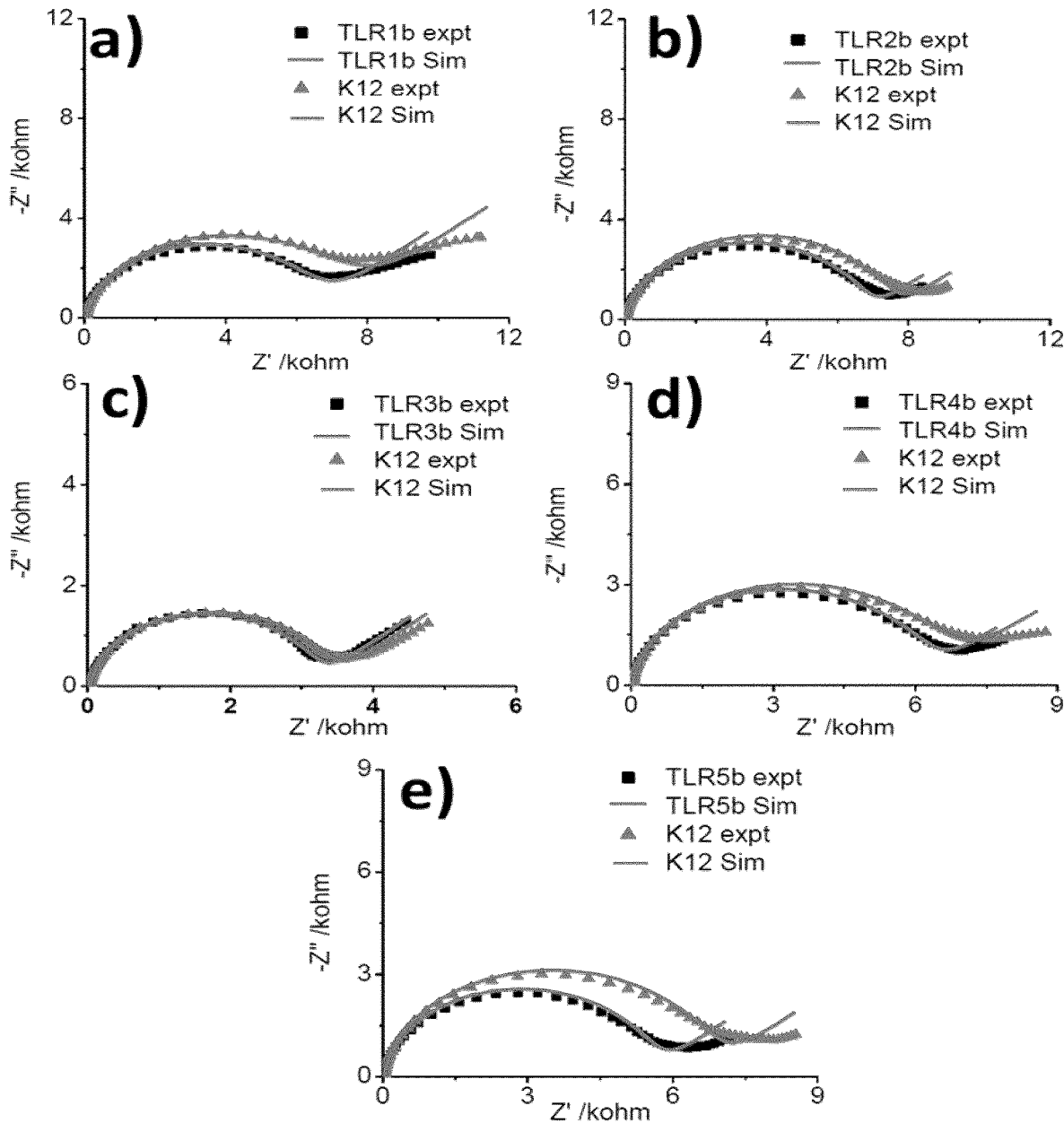
FIG. 10 is a series of Nyquist plots of TLR sensors before and after exposure to *E. coli* K12.

FIG. 10: Nyquist plot of the TLR sensors before and after exposure to E. Coli K12 whole-cells. The scatters are experimental data and the lines are simulated curves using model shown in FIG. 8f.

Figure 11:
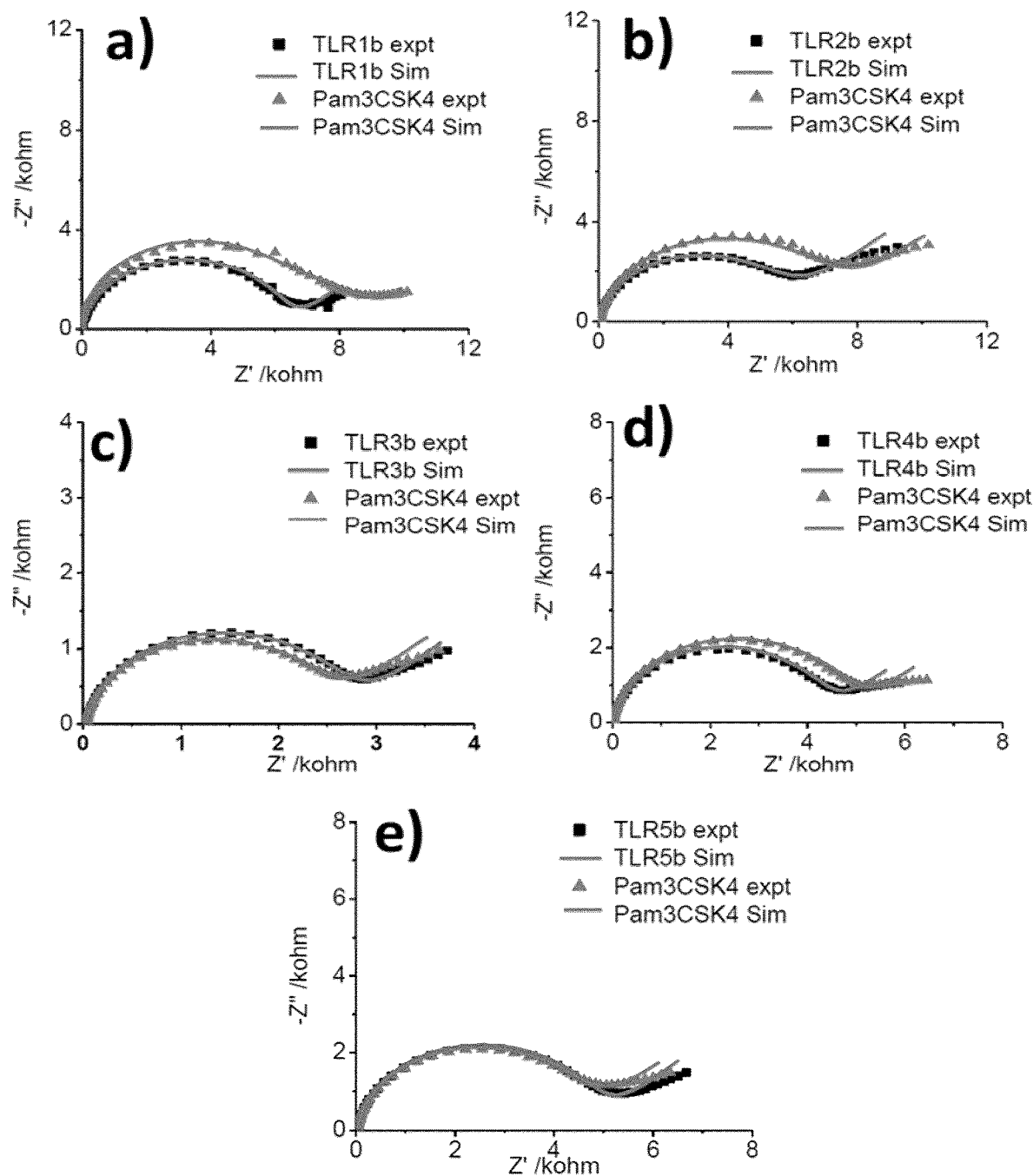
FIG. 11 is a series of Nyquist plots of TLR sensors before and after exposure to Pam3CSK4.

FIG. 11: Nyquist plot of the TLR sensors before and after exposure to PAM3CSK4 whole-cells. The scatters are experimental data and the lines are simulated curves using model shown in FIG. 8f.

Figure 12:
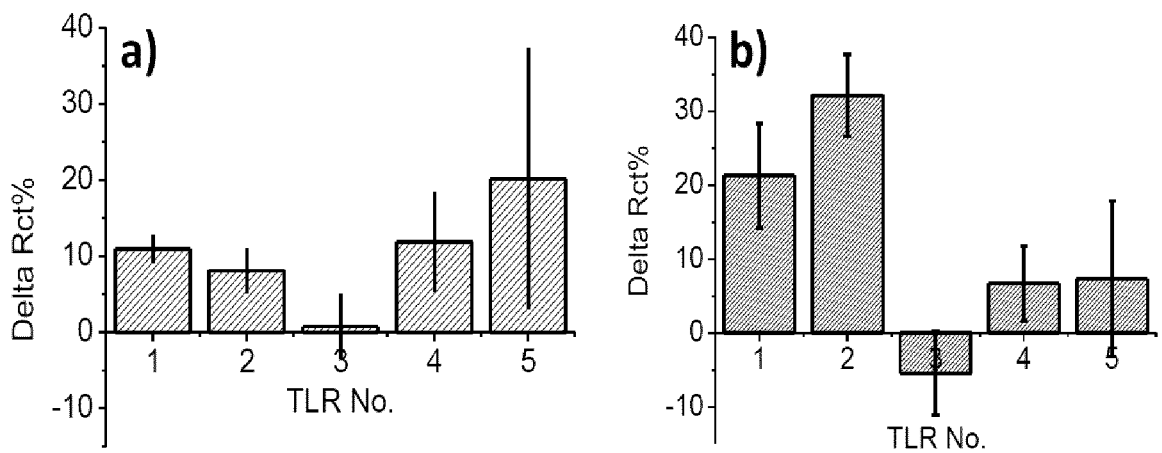
FIG. 12a is a plot showing the Delta Rct % for the multiplex sensor exposed to *E. coli* K12.
FIG. 12b is a plot showing the Delta Rct % for the multiplex sensor exposed to Pam3CSK4.

FIG. 12: Electrochemical responses obtained using TLR1-5 Multiplex sensor for E. coli K12 and Pam3CSK4. Delta Rct %=(Rct (After exposure)−Rct (before exposure))/Rct (before exposure).

Figure 13:
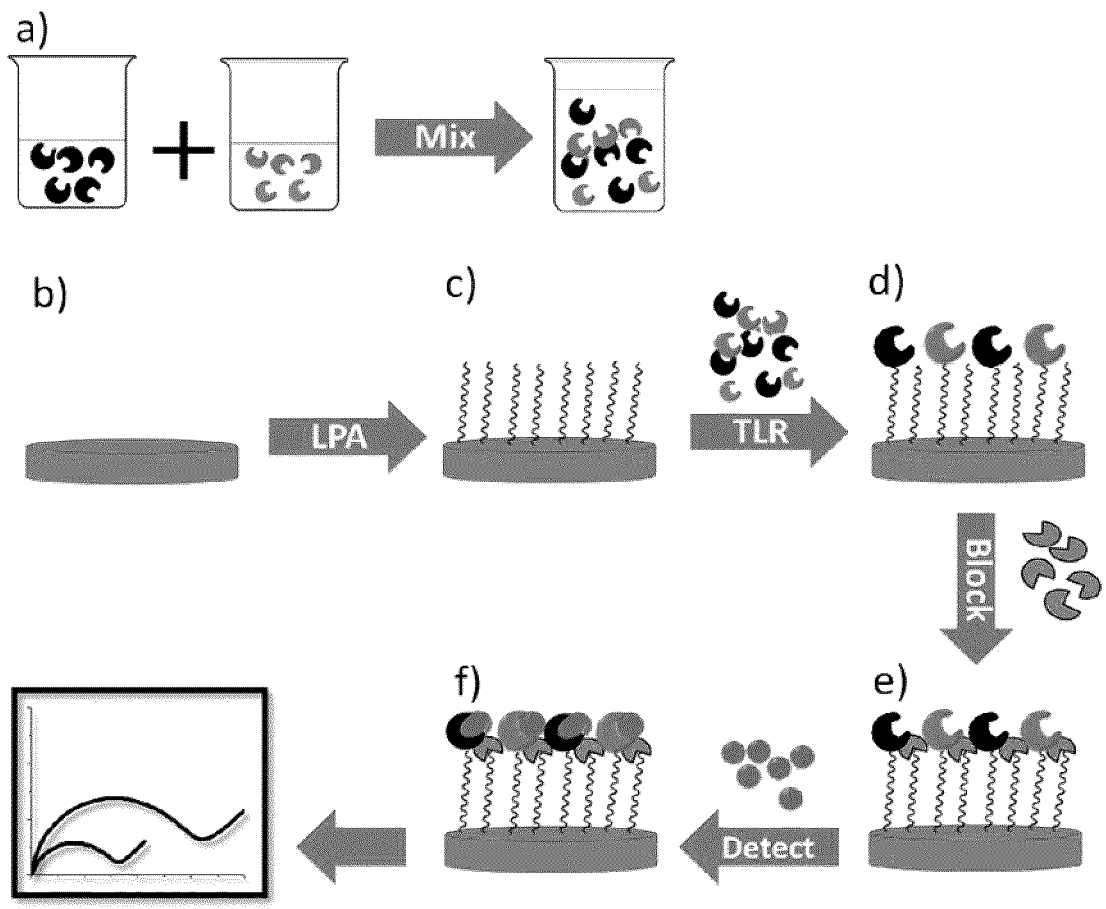
FIG. 13 is an illustration of a label-free detection scheme.

FIG. 13: a) Preparation of a mixed TLR1 and TLR2 solution with a ratio of 1:1; b) Bare gold surface; c) Gold surface modified with lipoic acid n-hydroxysuccinimide ester (LPA); d) Immobilization of TLR proteins; e) Blocking of unreacted LPA with ethanolamine; f) Detection of PAM3CSK4. The TLR protein used for the fabrication of the sensor are pure, recombinant mouse TLR1, TLR2 and the mixed 'TLR1 and 2' sample.

Figure 14:
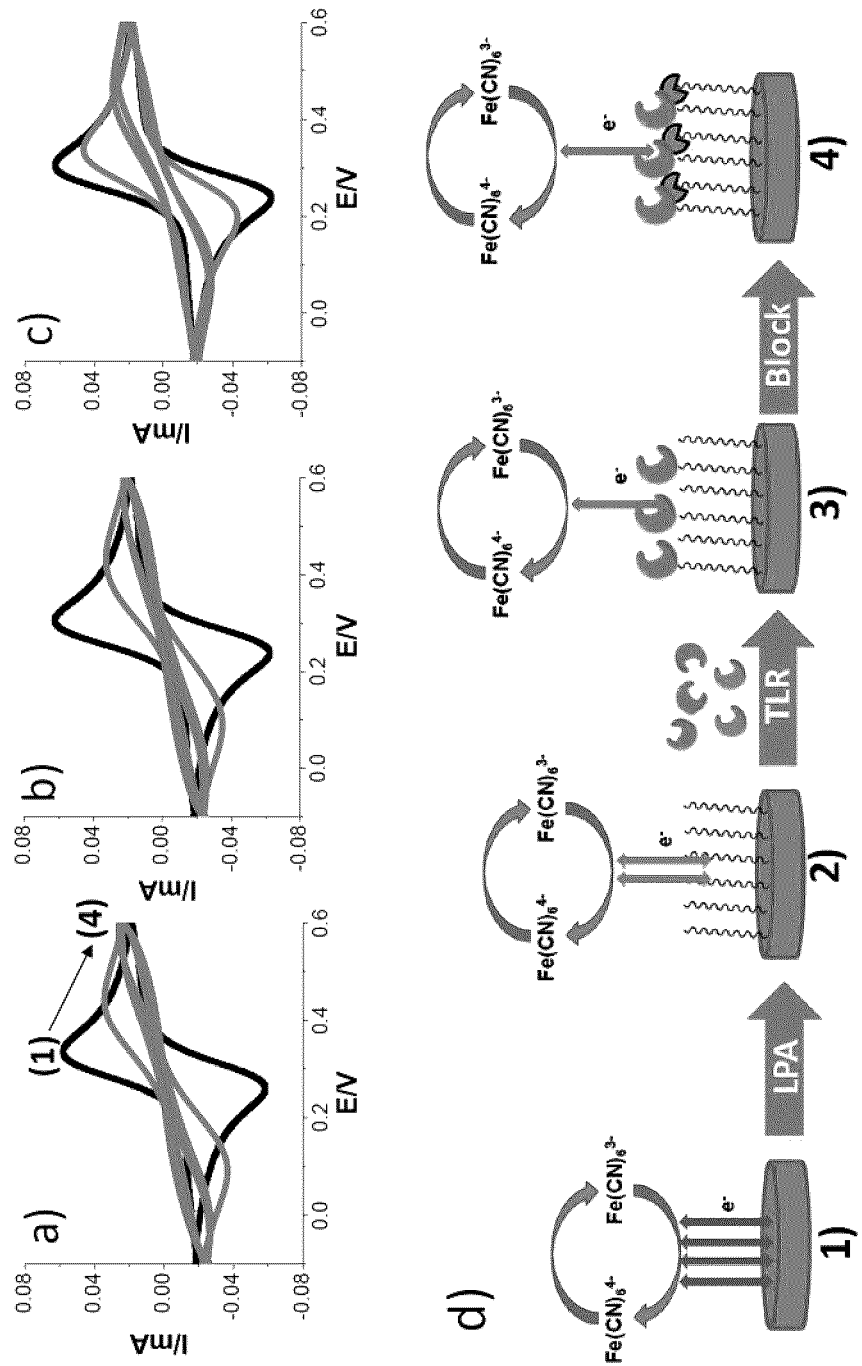
FIG. 14 is a series of voltammograms measured on various surfaces with different TLRs.

FIG. 14: Cyclic voltammograms measured on (1) bare gold surfaces, (2) gold modified with LPA, (3) amine-coupled TLR and (4) surfaces after blocking by ethanolamine. a) TLR1 sensor, b) TLR2 sensor, c) 'TLR1 and 2' mixed protein sensor. The CV was obtained using a scan rate of 0.1 Vs-1 in a 10 mM HEPES aqueous buffer at pH~7.4, containing 5 mM/5 mM Fe(CN)63-/4- as a redox couple and 1 M NaClO4 as the supporting electrolyte.

Figure 15:
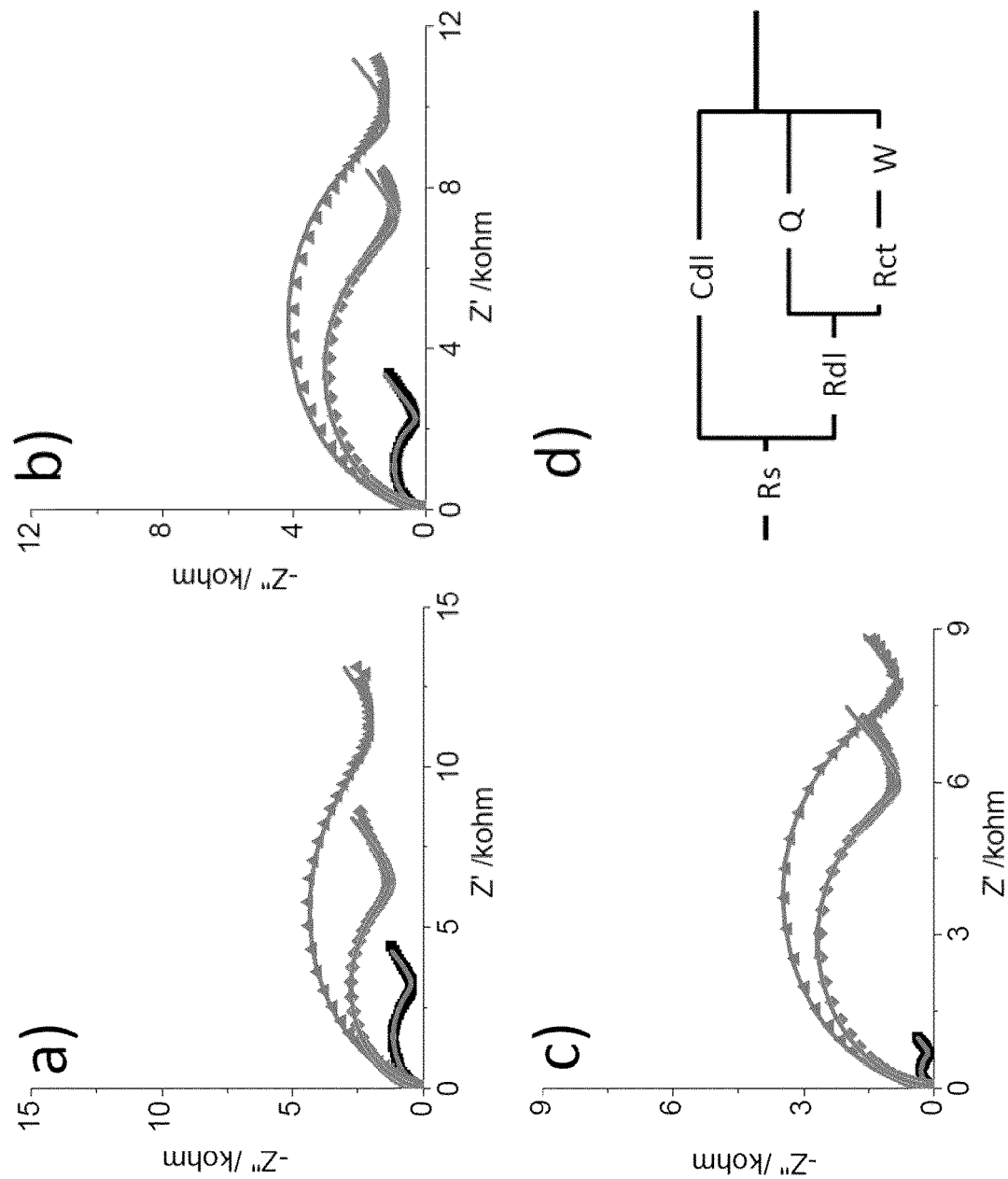
FIG. 15 is a series of Nyquist plots of a gold surface after various surface modifications.

FIG. 15: Step-by-step preparation and characterization of the (a) TLR1, (b) TLR2 and (c) 'TLR1 and 2' sensors. Nyquist plots of a gold surface after each modification step. (■) Gold modified with LPA; (▲) amine-coupled TLR; ( ) blocking of the TLR-modified surface with ethanolamine. The continuous lines fitted through the scatter plots are the calculated impedance curves using the circuit model shown in the (d) for estimation of the film resistance. Rs is the solution resistance, Rdl is the double layer resistance, Rct is the film resistance and W is the finite length Warburg impedance. The EIS measurements were carried out in a 10 mM HEPES aqueous buffer at pH~7.4, containing 5 mM/5 mM Fe(CN)63-/4- as a redox couple and 1M NaClO4 as the supporting electrolyte.

Figure 16:
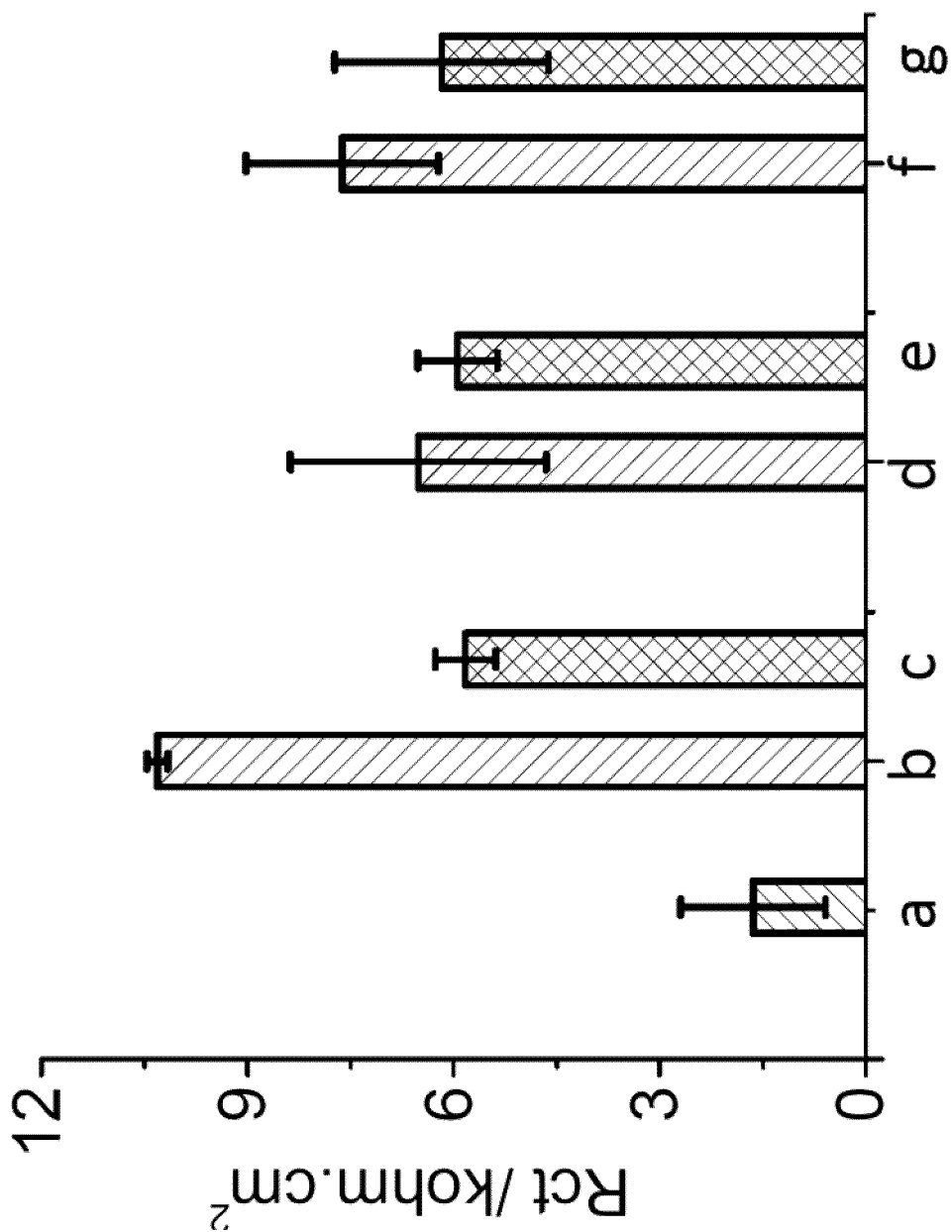
FIG. 16 is a statistical plot of the film resistance following various surface modifications.

FIG. 16: Statistical plot of the film resistance following each modification step, (a) LPA, (b) amine-coupled TLR1, (c) blocked TLR1, (d) amine-coupled TLR2, (e) blocked TLR2, (f) amine-coupled 'TLR1 and 2', and blocked 'TLR1 and 2', generated with the Rct estimated from using model shown in FIG. 14d.

Figure 17:
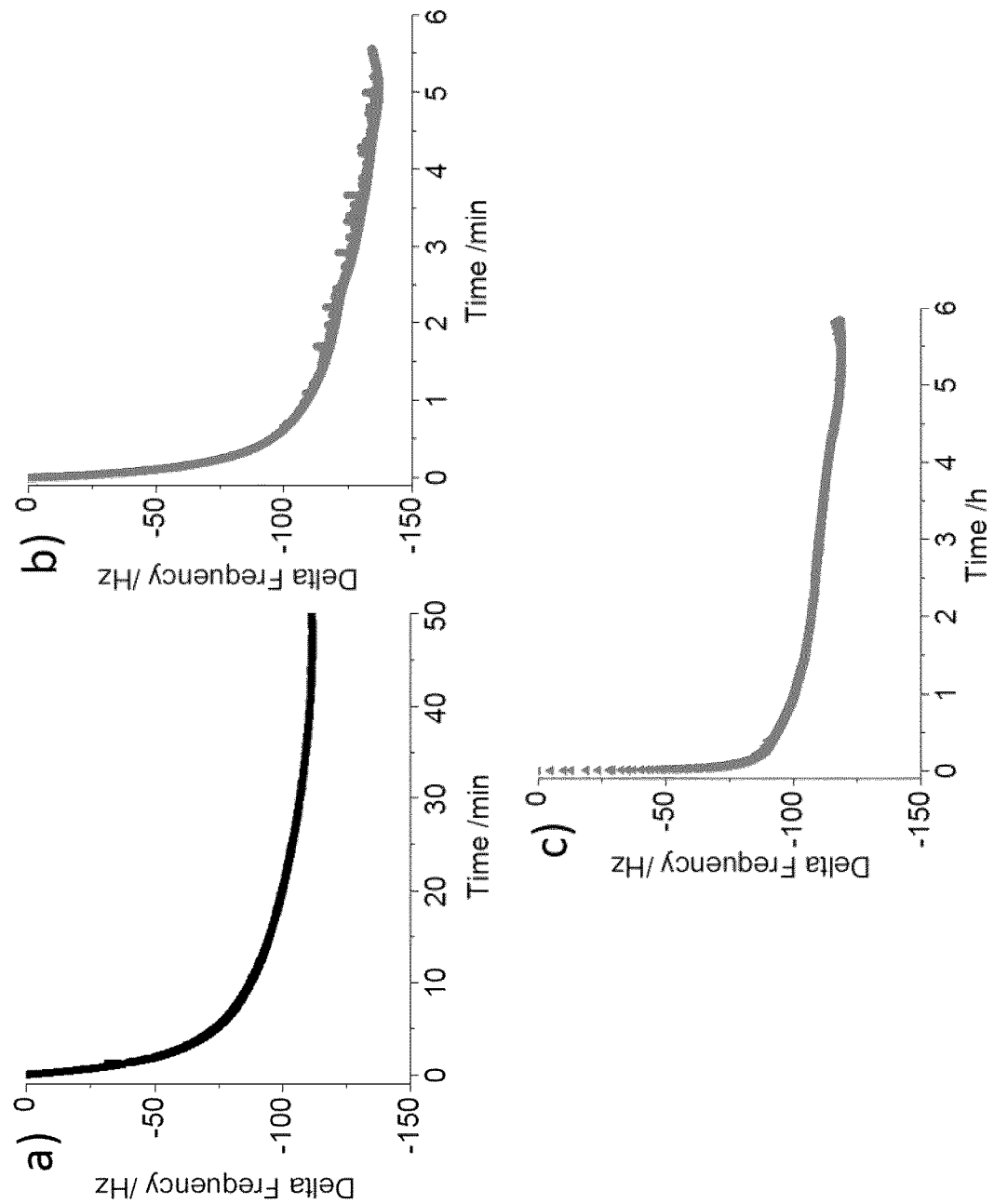
FIG. 17 is a series of plots showing the change in resonance frequency monitored by QCM after injection of various TLRs.

FIG. 17: Change in resonance frequency (Hz) monitored by QCM after injection of the respective (a) TLR1, (b) TLR2 and (c) 'TLR1 and 2' solution; The measurement was carried out until the signal reached a plateau.

Figure 18:
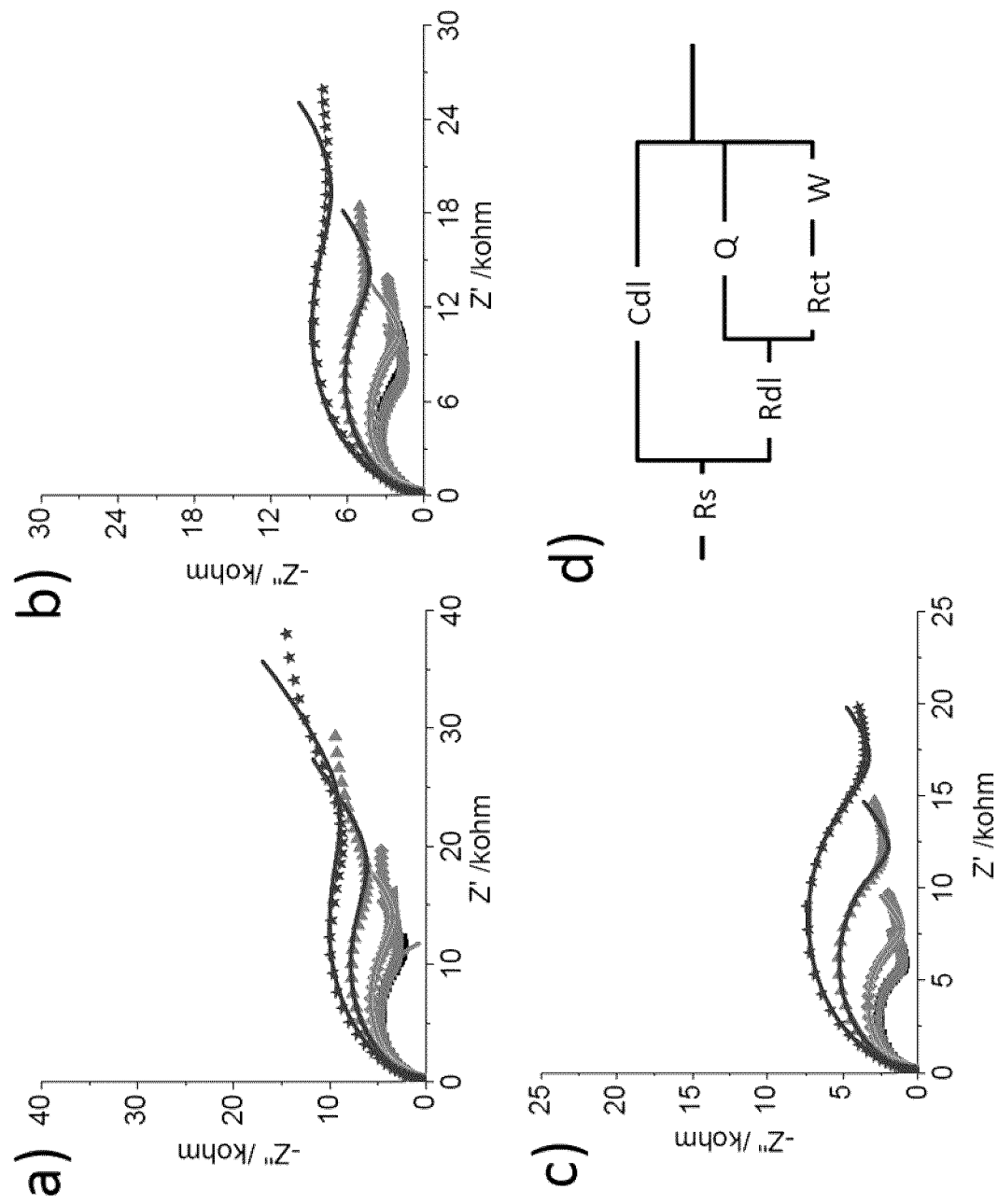
FIG. 18 is a series of Nyquist plots before and after exposing various TLRs to ligands of Pam3CSK4 at various concentrations.

FIG. 18: Nyquist plots before and after exposing the (a) TLR1, (b) TLR2 and (c) 'TLR1 and 2' sensors to ligands of Pam3CSK4 at solution concentrations of 5 μM, 10 μM, 25 μM and 50 μM respectively. Impedance results were recorded from 100 kHz to 0.1 Hz. The continuous lines fitted through the scatter plots are the impedance curves calculated using the circuit model shown in (d) for estimation of the film Rct. Within the circuit model shown, Rs is the solution resistance, Rdl is the double layer resistance, Rct is the film resistance, Cdl is the double layer capacitance, Q is the constant phase element of the film and W is the finite length Warburg impedance. The values for each element resulting from the modeling process are included in the Table S1, S2 and S3. The EIS measurements were carried out in a 10 mM HEPES aqueous buffer at pH~7.4, containing 5 mM/5 mM Fe(CN)63-/4- as the redox couple and 1 M NaClO4 as the supporting electrolyte.

Figure 19:
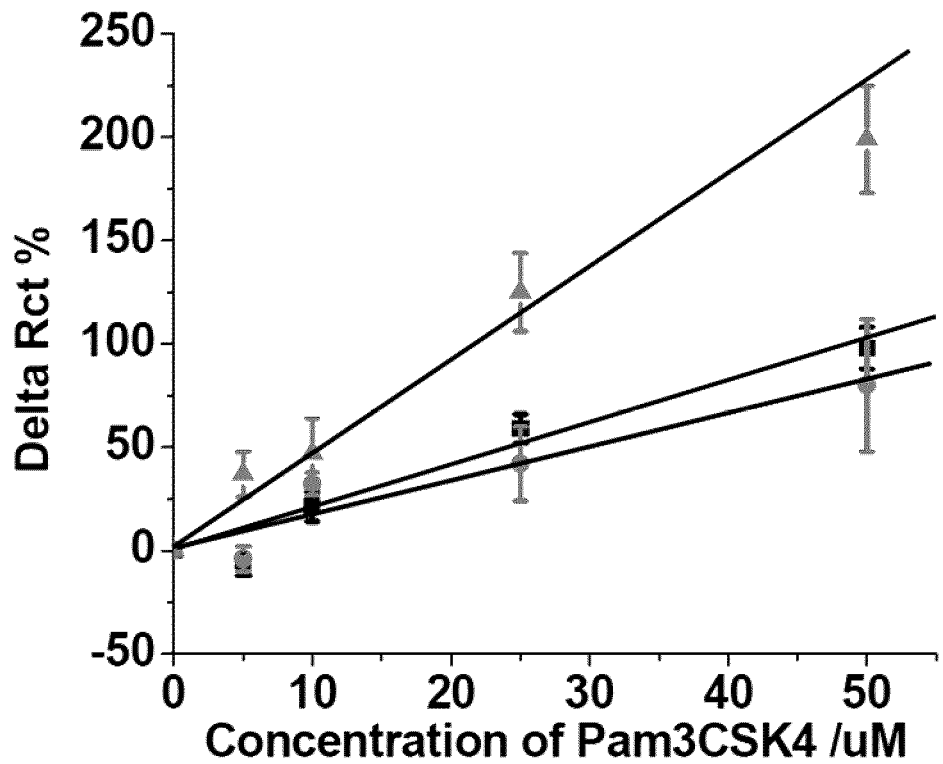
FIG. 19 is a plot showing calibration curves before and after exposing various TLRs to varying concentrations of Pam3CSK4.

FIG. 19: Calibration curves (ΔRct %) before and after exposing the respective TLR1(■), TLR2(•) and 'TLR1 and 2'(▲) sensor surfaces to varying concentrations of Pam3CSK4. ΔRct/o=[Rct (after immersion at a concentration)−Rct (before immersion)]/Rct (before immersion).

Figure 20:
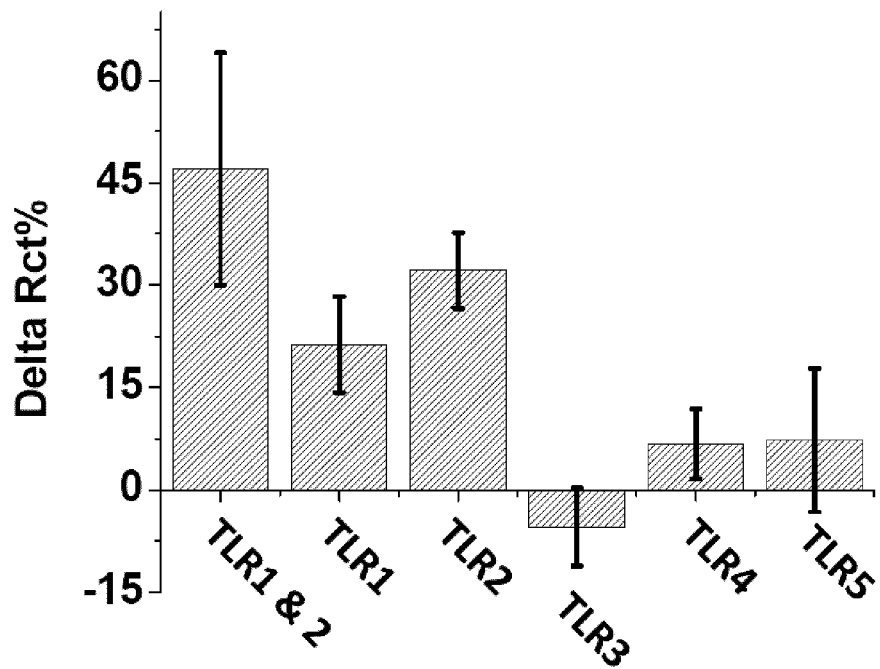
FIG. 20 is a graph showing the response of sensors built with various TLRs to 10 μM of Pam3CSK4.

FIG. 20: Selectivity test by monitoring responses from sensors built with 'TLR 1 and 2', TLR1, TLR2, TLR3, TLR4/MD-2 and TLR5 sensors to 10 μM of Pam3CSK4.

Figure 21:
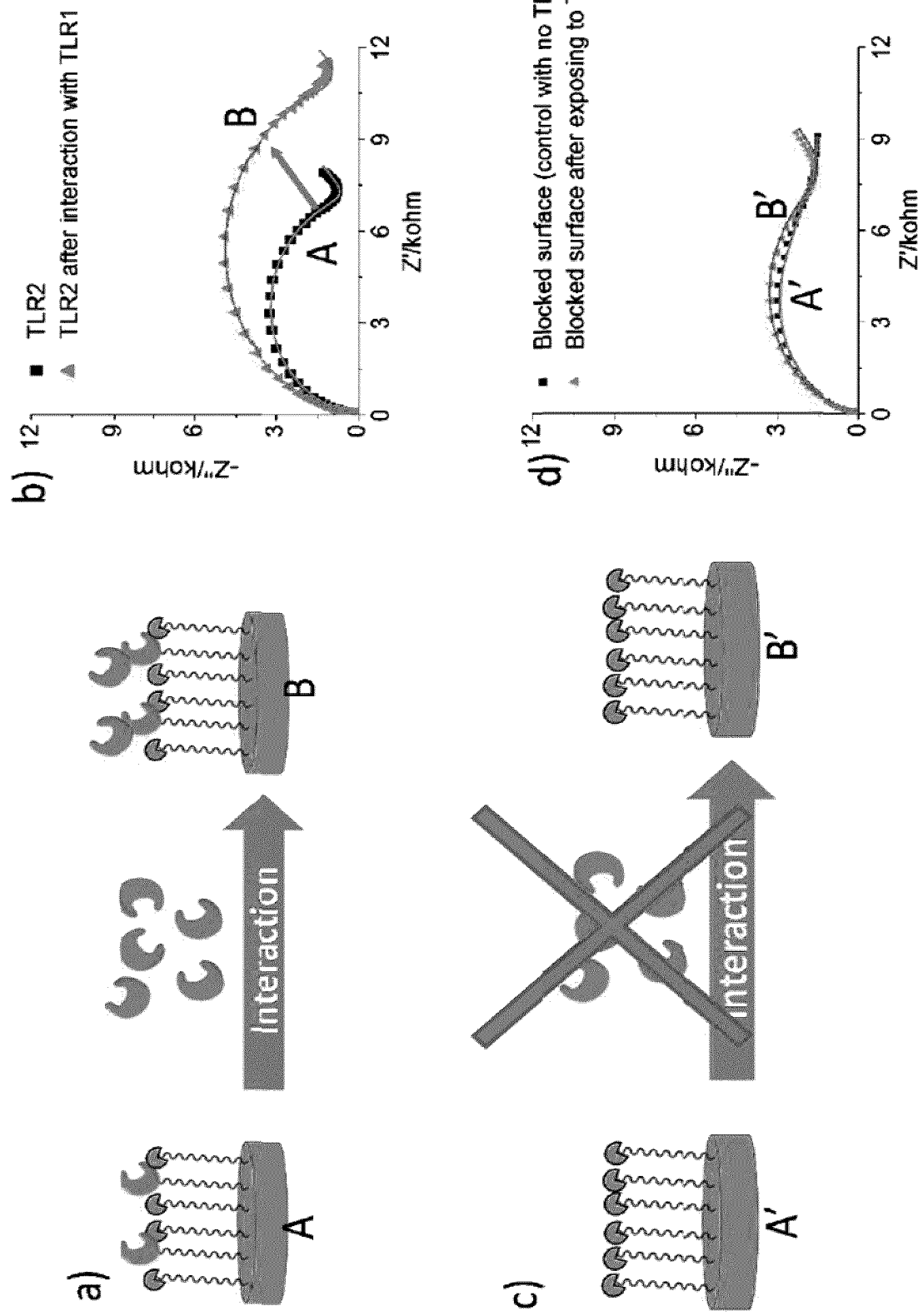
FIG. 21 is an illustration and series of plots showing the response of blocked surfaces after being exposed to TLR1, TLR2 or heterodimerized TLR1+TLR2.

FIG. 21: a) Illustration of exposing blocked TLR2 surfaces to TLR1 and b) monitoring the film resistance increasing using electrochemical impedance spectroscopy. c) and d) Illustration of exposing blocked surface only (No TLR2) to TLR1 and the EIS measurement. The EIS was carried out using same conditions and parameters described in the FIG. 5 caption.

Figure 22:
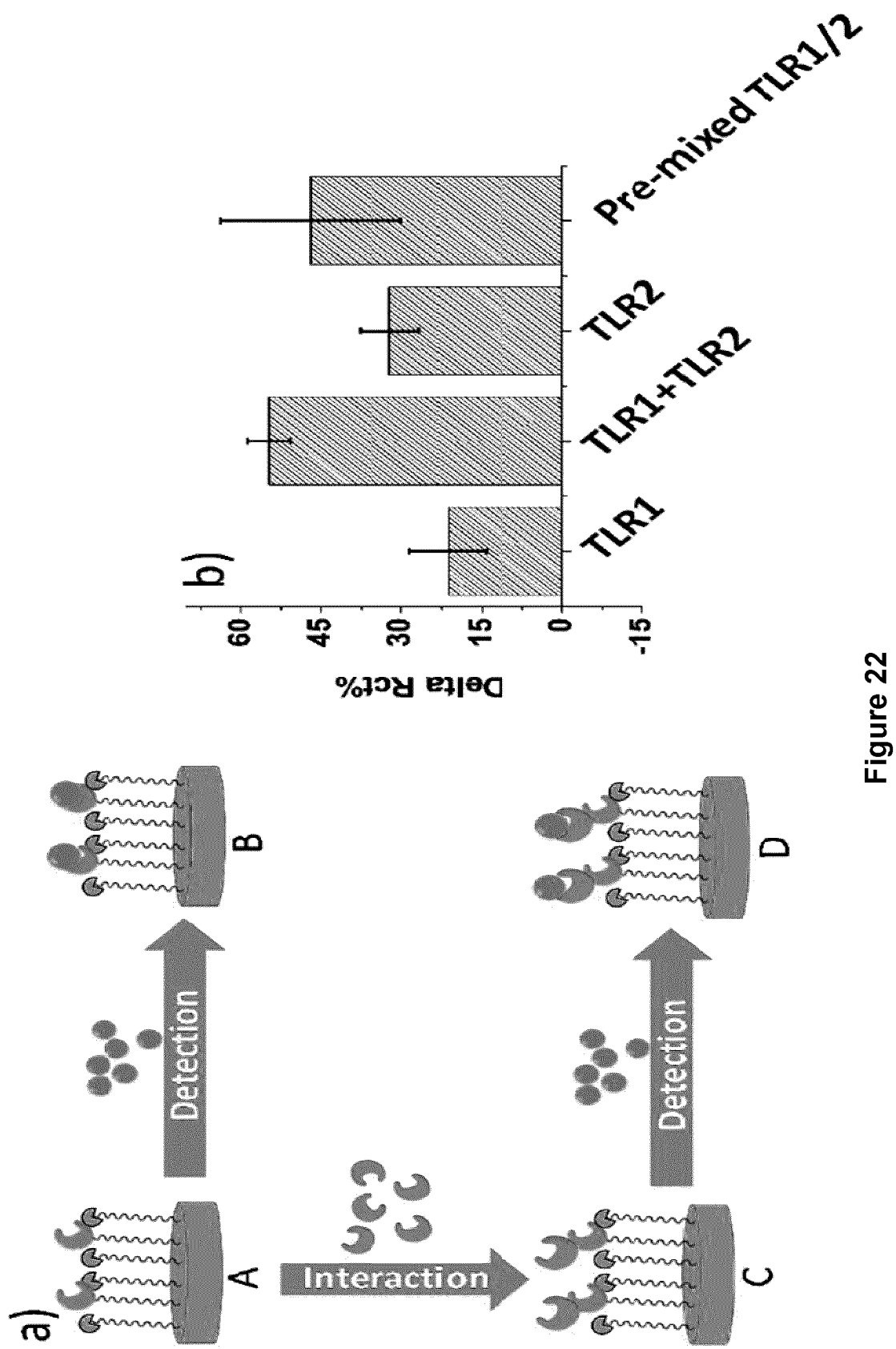
FIG. 22 is an illustration and graph showing the response of sensors built using heterodimerized TLR1+TLR2 to 10 μM of Pam3CSK4.

FIG. 22: a) Illustration of surface hybridization and detections. b) Electrochemical responses to 10 μM of Pam3CSK4. 'TLR1+TLR2' is prepared by immobilizing TLR1 first, blocking and then exposure to TLR2. 'Pre-mixed TLR1/2' is preparing mixed TLR1 and TLR2 in solution first before immobilizing on surfaces. (A to B) TLR1 sensor is used for detection. (A to C) TLR1 is exposed to TLR2 for interaction. (C to D) Hybridized TLR1 and TLR2 sensor is used for detection. Same protocol was also used with reversing TLR1 and TLR2 in the steps.

EXAMPLES

Experimental Conditions for Examples 1 to 3

Materials.

Gold/Silicon (Au/Si) was prepared by Nanofabrication facility at University of Western Ontario (London, ON). Phosphate buffered saline (PBS) buffer (pH~7.4) and Aminoferrocene were bought from Sigma-Aldrich (Oakville, ON). Potassium ferrocyanide and sodium perchlorate was purchased from EM Science (Billerica, Mass.) and Alfa-Aesar (Ward Hill, Mass.) respectively. The recombinant mouse TLR1 (1476-TR-050), recombinant human TLR4/MD-2 (3146-TM-050/CF) and recombinant mouse TLR5 Fc Chimera (7915-TR-025) were obtained from R&D systems (Minneapolis, Minn.). All aqueous solutions were prepared using deionized water (Millipore Milli-Q; 18 MΩ·cm resistivity). All reagents were used as received with no further modification unless otherwise stated within the manuscript. Milli-Q water was used throughout this study for all purposes including electrochemistry, sample solutions and rinsing. 1-Lipoic acid n-hydroxysuccinimide ester (LPA) and 2-Aminoethylferrocenylmethylether were synthesized following published protocols.

Preparation of Au/Si Modified with LPA.

LPA solution (2 mM) was prepared by dissolving the LPA into anhydrous ethanol. The Au/Si pieces (1 cm×1 cm) were immersed in LPA ethanol solutions for 48 hours at 277 K, then removed, rinsed with ethanol thoroughly and blown dried using a stream of nitrogen gas.

Preparation of TLR1, TLR4, TLR5 and *Escherichia coli* K12 Solutions.

TLR1, TLR4 and TLR5 solutions were prepared according to the manufacture instruction by dissolving the receptors in PBS buffer (pH~7.4) and stored at 277 K respectively. All the TLRs concentrations are 100 μg/ml. *Escherichia Coli* K12(*E. coli* K12) culture was provided by University of Toronto Scarborough Biology Teaching Laboratory. The bacteria was washed and resuspended into PBS buffer (pH~7.4). The concentration of *E. coli* K12 was calibrated using light scattering. The final concentration used in the experiment was $5 \times 10^8$ CFU/ml.

Preparation of Microarrays of TLR1, TLR4 and TLR5.

Figure 6:
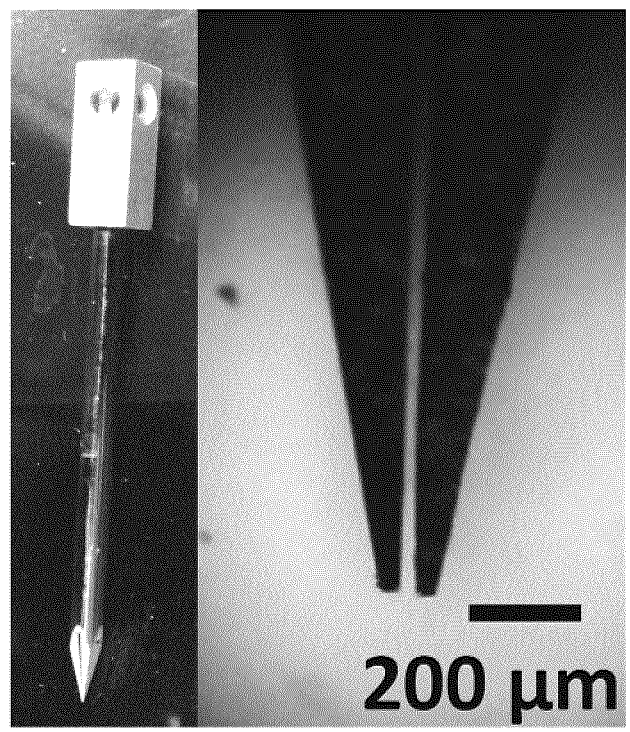
FIG. 6 is a photograph of the pin used for depositing TLR spots on a surface, using an Arrayit™ Spotbot 3.

Arrayit Spotbot 3 (Sunnyvale, Calif.) equipped with Megasonic Wash Station was used for creating the microarrays. Prepared TLR1, 4, and 5 solutions were loaded into the cells in the Arrayit microplates (Sunnyvale, Calif.). Deionized water was used as the wash buffer for the 946MP2 pin (Sunnyvale, Calif.), which is shown in FIG. 6. The humidity of 85%-95% was maintained during the spotting process. The detailed spotting conditions are listed below.

Pin configuration: 1×1
Spot spacing (center to center): 150 μm (TLR5) and 200 μm (TLRs)
Pre-print spots per sample: 10
Sample loading time: 10.0 s
Pre-print time: 0.0 s
Print time: 1.0 s
Number of wash/dry cycles: 5
Wash/dry duration: 3.0 s
Last cycle wash duration: 5.0 s
Last cycle dry duration: 10 s After printing was completed the substrates were placed on top of a moist filter paper by PBS (pH~7.4) inside a Petri dish. The Petri dish was then wrapped with Parafilm and incubated for 48 h at 5° C.

The substrates were then removed and rinsed thoroughly using deionized water and blown dried using nitrogen gas. The substrates were modified in the following step by immersion in 25 mM of 2-Aminoethylferrocenylmethylether or Aminoferrocene PBS solutions (pH~7.4) for 1 hours at 277 K, removed afterward, washed using deionized water and blown dried with a stream of nitrogen gas.

Secm Measurements.

SECM experiments were carried out with a CHI-900b (CH Instruments, Austin, Tex.) at room temperature in an electrochemical cell using a three-electrode configuration. A Pt wire, an Ag/AgCl/3.0M KCl electrode, and a Pt SECM tip were fitted in as the respective counter electrode, reference electrode, and working electrode. Modified Au/Si substrates were mounted in the cell and used without any bias during the experiment. The SECM probe electrode was custom made by sealing a 25 μm dia. Pt wire (99.95%, Alfa Aesar, MA, USA) into a micropipette, which is pulled from a glass capillary 1.5/0.84 mm OD/ID (World Precision Instruments, Inc., FL, USA) using the micropipette puller (PP-83, Narishige, Japan). The electrode was polished carefully to RG-5 using alumina lapping discs (3.0, 0.3 and 0.05 μm, World Precision Instruments, Inc., FL, USA). Cleaning of the electrode before each experiment was carried out by sonication in water/ethanol (50:50) for 10 mins and running cyclic voltammetric scans in acid ($H_2SO_4$, pH~1) between 0 and 1.4 V for 100 cycles at scan rate of 0.5 V/s. The solution for SECM measurement contains 2 mm K4[Fe(CN)6] aqueous solution as the redox probe and 50 mM NaClO4 as the supporting electrolyte. A steady current is always obtained in prior to any approach curve measurement and imaging.

The imaging was carried out with 5 μm increment step (0.066667s) at an applied potential of 0.5 V. The modified Au/Si substrates were not biased during the measurement.

COMSOL Multiphysics.

The experimental approach curves were normalized to the steady-state current before fitting them against theoretical curves generated using COMSOL Multiphysics software. Subsequently, the reaction kinetics for the modified surfaces was estimated. The continuous and dashed lines are the approach curves shown in the FIG. 2b are calculated using known values for the dimensionless rate constant ($\Lambda$). The normalized distance (L) is the ratio of the tip/substrate separation (d/a) to the tip radius. Rate constant, $k^0$, plots in FIG. 2c are for the surface following each modification step. These rate constants were calculated using the dimensionless rate constants A values estimated by the contrasting the experimental approach curve data against the calculated approach curves.

FIG. 7 shows three approach curves obtained from 3 samples of surfaces modified with aminoferrocene.

Example 1

Experiments were conducted to prepare a microarray of Toll-like receptors (TLR) for the detection of PAMPs using Scanning Electrochemical Microscopy (SECM).

As shown at FIG. 1, a gold surface was modified with lipoic acid n-hydroxysuccinimide ester (LPA) (detailed experimental conditions are shown further below). Microarrays of TLRs were created by using Arrayit™ spotter in steps a) and b). TLRs were immobilized onto the LPA layer via amine coupling. The uncovered surface area was then modified with 2-aminoethylferrocenylmethylether to enhance the imaging contrast, as shown in step c). The samples were then characterized using scanning electrochemical microscopy (SECM) in step d).

Figure 2:
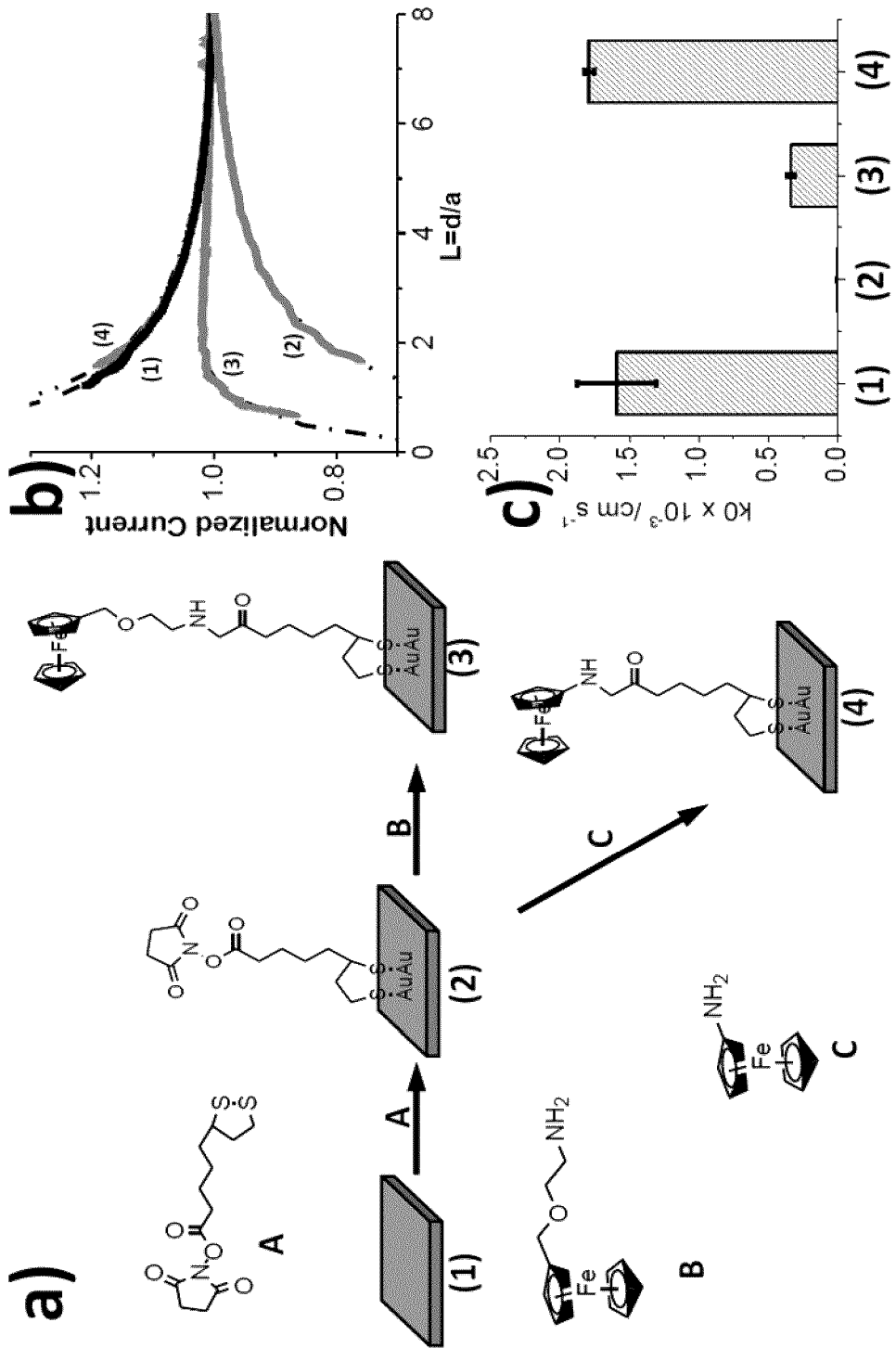
FIG. 2a is an illustration of the surface chemistry for attaching ferrocene derivatives to a surface.
FIG. 2b is a plot showing approach curves for a bare gold surface (1), compared to approach curves after lipoic acid n-hydroxysuccinimide ester addition (2), 2-aminoethylferrocenylmethylether addition (3) and aminoferrocene addition (4)
FIG. 2c is a plot showing rate constants $k^0$ for the surface following each modification step (1) to (4) as numbered in FIG. 2b.

The surface chemistry is illustrated at FIG. 2, which includes FIGS. 2a, 2b and 2c. FIG. 2a illustrates the surface chemistry for attaching ferrocene derivatives; FIG. 2b shows approach curves for a bare gold surface, compared to approach curves after lipoic acid n-hydroxysuccinimide ester addition, 2-aminoethylferrocenylmethylether addition and aminoferrocene addition. The dashlines represent calculated curves by COMSOL Multiphysics simulation using known values for the dimensionless rate constant (A). FIG. 2c shows rate constant $k^0$ and plots for the surface following each modification step.

Referring to FIGS. 2a and 2b, the reaction was characterized using SECM approach curves, which showed that bare gold surface gave positive feedback as the tip approached closer to the surface. The feedback mode changed when the surface was modified with LPA, which blocked the electron transfer and promoted negative current feedback. LPA acted as the linker molecule for both Fc derivatives and TLR proteins. As shown in FIG. 2a steps B and C, Ferrocene molecules with different side chain lengths were tested. The approach curves showed less negative feedback after modification with 2-Aminoethylferrocenylmethylether, while modification with Aminoferrocene gave positive feedback even very similar to bare gold surface. The positive feedback of Fc on surface was observed and verified using non-conductive surfaces.

The mechanisms for regeneration and blocking redox species are illustrated at FIG. 3. The rate constant ($k^0$) in FIG. 2c was obtained from comparing experimental and COMSOL simulated approach curves as shown in FIG. 2b. The rate constant for bare gold was measured to be $(1.59\pm0.28)\times10^{-3}$ cm s$^{-1}$ and kinetics slowed down significantly when modified with LPA, as the rate constant for LPA was $(7.96\pm2.81)\times10^{-6}$ cm s$^{-1}$, which is almost 1000 fold smaller. After further modifications with two Ferrocene (Fc) molecules, the kinetics increases, as surfaces modified with 2-aminoethylferrocenylmethylether was estimated to be $(3.38\pm0.28)\times10^{-4}$ cm s$^{-1}$, when modification with aminoferrocene gives $(1.79\pm0.03)\times10^{-3}$ cm s$^{-1}$. Interestingly that aminoferrocene surface promoted positive feedback, similarly to the conductive gold surface. It was demonstrated that the regeneration kinetics for TLR5 and LPA were very similar, which means that SECM imaging is not able to differentiate the TLR5 spots on LPA when backblocking was carried out using ethanolamine. In order to see the biorecognition element spots towards using these TLRs for pathogen detections, enhanced contrast may be desirable.

Example 2

Since LPA-Fc surfaces promoted a positive feedback mode, which was different from feedback mode of LPA or LPA-TLRs, it may be desirable to enhance the contrast between the two surfaces. 4 identical TLR5 spots were made on LPA and the background (non-spotted area) was modified with 2-aminoethylferrocenylmethylether (FIG. 4). Experiments were conducted to image these TLR5 spots by SECM.

SECM image in FIG. 4a showed that by changing the electrochemical property of LPA, which is the background, the microarrays of TLR5 can be recognized. A simplified explanation is illustrated in FIG. 4b. High current measured at LPA-Fc background area was due to a combination of redox species from both diffusion and surface regeneration. Fc groups on the surface helped distributing the electrons and therefore increased the regeneration efficiency. In contrast, the surface regeneration was suppressed at the spots, as TLR5 is electrochemically blocking the electron transfers from the surface. Therefore, lower current was observed. The peak sizes for these microarrays were measured to be quite reproducible at approximately 0.12 nA, as shown at FIG. 4c.

Using different Fc molecules, it was possible to obtain different current feedbacks from the surfaces, which can allow for tuning the background current. This may be helpful for investigating different proteins.

Example 3

Referring to FIG. 5, experiments were conducted with TLR1, 4 and 5, which all aim at recognizing PAMPs of bacteria, such as E. coli K12 bacteria. TLRs are known to recognize different Pathogen Associated Molecular Patterns (PAMPs) and a combination of them can provide non-specific broad spectrum detection.

A microarray of 9 spots was prepared with 3 spots for each TLR and the background was modified with aminoferrocene. The image obtained by SECM can be seen at FIG. 5a.

A second microarray was similarly prepared, but with additional bacteria contacting the TLRs in each spots. The image obtained by SECM can be seen at FIG. 5b.

As the signal for each spot is from comparison of the spot and the background current, SECM images in FIGS. 5a and 5b were normalized to the initial current (background) on the left of image for each horizontal line. The results showed that the normalized current signals for each spot on FIG. 5b were more depressed than on FIG. 5a, likely due to additional electrochemical blocking from E. coli K12.

Cross-sectional analysis was carried out as the example shown at FIG. 5c. The normalized currents for spots A (TLR1), B (TLR4) and C (TLR5) were measured at 0.9730, 0.9586 and 0.9675. The currents for spots A*, B* and C* dropped down to 0.9458, 0.9139 and 0.9197 for TLRs combined with E. coli K12.

The difference between the spots and the background (e.g. 0.0325=1−0.9675) was compared using statistical analysis, as shown at FIG. 5d. The current values for TLR1, 4 and 5 were 0.0264±0.0004, 0.0448±0.0025, and 0.0251±0.0057. These values were compared with the ones from samples containing bacteria, which were 0.0473±0.0049 (A*), 0.0661±0.0156 (B*) and 0.0645±0.0116 (C*). The difference in the signals due to the presence of E. coli K12 can be recognized.

A third microarray of 9 spots with 3 spots for each TLR was also prepared, but the background was not modified using ferrocene derivatives. The image obtained by SECM can be seen at FIG. 5e. It can be seen that the TLR spots cannot be differentiated from the background using SECM when no ferrocene derivative is added.

One advantage of this method is direct comparison of a plurality of TLRs on the same sample, because spots were made next to each other and the SECM tip could measure over 3 spots with each line of scanning. These results presented in FIG. 5 demonstrated that by using Fc-group to enhance the contrast, it was possible to study the small electrochemical differences of these bio-recognition elements. Another advantage of this method is to have multiple spots for the same TLRs, which provide statistical analysis within each biosensor.

Discussion on Examples 1 to 3

An electrochemical multiplex platform was developed, and used towards biosensing. Electrodes comprising multiple toll-like receptors (TLRs 1, 4 and 5) were prepared and investigated. The TLRs were used as biorecognition elements for broad spectrum non-specific detection of pathogens. An illustration was made here with the recognition of E. coli K12 cultures. It was shown that it was possible to improve Scanning Electrochemical Microscopy imaging and have better contrast using Fc-derivatives, for example by promoting positive feedback current of the background. The two tested Fc-derivatives gave different levels of current enhancement, and may therefore be used for tuning the background.

It is understood that the method described herein is not to be limited to investigation of TLRs, and may be used for the surface recognition of any other protein, peptide or antibody. It is also understood that the method described herein may be used for the surface recognition of any other molecule containing —$NH_2$ groups.

Example 4

Experiments were conducted to prepare and characterize TLR biosensors. Impedance measurements are shown for TLR1 (FIG. 8a), TLR2 (FIG. 8b), TLR3 (FIG. 8c), TLR4 (FIG. 8d) and TLR5 (FIG. 8e). Electrochemical impedance measurement was carried out after each building step: Modification with linker molecule LPA; attachment of TLR protein; and blocking of the background. The experimental data obtained by impedance measurements is fitted with the model shown at FIG. 8f to evaluate the film resistance Rct.

For each multiplex TLR sensor, 5 separate gold electrodes were used for binding TLR 1 to 5. The 5 modified electrodes/sensors were exposed to the analyte solution and evaluated one by one using potentiostats and electrochemical cells.

The preparation of each TLR biosensor was evaluated using EIS. It is understood that cyclic voltammetry as well as electrochemical impedance microscopy can also be used for monitoring the modification. When a gold surface was modified with LPA as the linker molecule, a small Rct, film resistance was observed; then a 5 µl of TLR solution at 2 µM was applied to attach proteins onto the LPA, which resulted in an increase of Rct. Ethanolamine was then applied to deactivate unreacted LPA. Due to dissociation of unspecific absorbed TLR, the Rct dropped slightly. Experimental curves were evaluated using a model to obtain the Rct values, which can be seen at FIG. 9. Measurements from at least triplicated samples prepared were used to obtain statistic information.

Example 5

Experiments were conducted to obtain Nyquist plots of TLR sensors before and after exposure to E. coli K12 (FIG. 10) and before and after exposure to Pam3CSK4 (FIG. 11).

The Rct of the TLR1 sensor was measured as shown in FIG. 10a. The TLR1 sensor was exposed to an E. coli K12 whole-cell buffer solution for 20 minutes. The sensor was then removed, washed thoroughly and characterized in the electrochemical cell measuring the Rct again. The difference in Rct before and after exposure is the response triggered by the target. The same protocol was carried out for all remaining TLRs (TLRs 2-5) to obtain one set of pattern for E. coli K12 (FIGS. 10b to 10e). Multiple sets were investigated for statistical relevance. In additional to the target of E. coli K12, The TLR multiplex sensor was also validated using a PAMP, Pam3CSK4, which is a synthetic material that can trigger responses by binding to TLR1 and TLR2 (FIG. 11).

The responses of both tests were evaluated and plotted in the FIG. 12: FIG. 12a shows the Delta Rct % for the multiplex sensor exposed to E. coli K12, and FIG. 12b shows the Delta Rct % for the multiplex sensor exposed to Pam3CSK4.

E. coli. K12 triggered 10% changes for both TLR1 and TLR2, possibly due to the PAMPs in the cell wall, such as lipoproteins. The lipopolysacchride and flagellin protein have triggered 10% and 20% changes for TLR4 and TLR5 respectively. TLR1, 2, 4 and 5 are known for detecting bacteria species. TLR3 is shown to be silent in this regard, which shows the selectivity of the sensor. TLR3 is known for binding viral species, therefore it is expected to be silent when exposed to bacterial species. The validation with Pam3CSK4 in FIG. 12b shows that there are limited responses from TLR3 to 5. In contrast, the responses from TLR1 and 2 are much higher at 20% and 35%. These different responses obtained from different TLRs for a species can be used for differentiating biological species, as it was shown that different species triggered different patterns when exposed to TLR multiplex sensors.

Example 6

Electrochemical Detection of Pam3CSK4 Using a Hybridized 'Toll-Like Receptor 1 and 2' Sensor An investigation has been carried out exploring the interactions between toll-like receptors (TLR) 1 and 2 with Pam3CSK4, a synthetic triacylated lipopeptide that mimics the structural moieties of its natural Gram negative bacterial pathogen-associated molecular pattern (PAMP) counterpart. The interaction Pam3CSK4 interaction was probed using electrochemical sensors developed with the 'TLR1 and 2' proteins immobilized as biorecognition elements; these sensors represent the first hybridized TLR sensors. The results show that sensors fabricated by immobilizing a mixture of TLR1 and 2 generate higher electrochemical responses when exposed to the analyte in comparison to the control sensors fabricated using pure TLR 1 or 2 standalone. Without being bound to any specific theory, the present inventors believe that the enhanced responses are due to the dimerization and cooperative interaction between TLR1 and 2 upon exposure to the target recognition pattern and, thus, improved interaction affinity. The detection results of Pam3CSK4 with the hybridized 'TLR1 and 2' sensor were calibrated along with results from the standalone TLR1 and TLR2 protein sensors. To further examine the TLR suite interactions through the exploitation of this electrochemical sensor fabrication technique and, taking our inspiration from nature, a PAMP selectivity test was carried out, including TLRs 1-5 as standalone biorecognition elements and the hybridized 'TLR 1 and 2' sensor surface.

Use of TLR or Combination of TLRs for Bacterial Detection

Toll-like receptors (TLRs) play an important role in the innate immune response of mammalian species through the induction of a signaling pathway following the recognition of evolutionarily conserved pathogen-associated molecular patterns (PAMPs)[1]. These PAMPs are inherent, specific and reoccurring regardless of species or strain for each generic pathogen type, Gram-negative and Gram-positive bacteria, virus and fungi. A TLR suite for several mammalian species have been established; the human suite, for example, consists of ten (10) unique biochemicals for which a unique recognition pattern for the generic pathogen types and their associated PAMPs has been identified through both in vivo and in vitro studies[2-4]. In terms of the exploitation of TLRs for use as sensor biorecognition elements, there is a body of peer-reviewed research in existence that proves their efficacy[5-9]. It has been determined that heterodimerization interactions occur between TLRs when they are exposed to specific PAMPs, such as between 'TLR1 and 2' and 'TLR 2 and 6' when shown tri- or diacylated lipopeptides, respectively[10].

The present study focuses on the interaction of the extracellular triacylated lipopeptides (Ac3LP), which are associated with the cell wall structure of Gram (–) bacteria, with TLRs 1 and 2[10]. For these experiments, Pam3CSK4, a synthetic triacylated lipopeptide that mimics the structural moieties of the Ac3LP of Gram (–) bacteria, is being exploited[11]. It should be noted that the cell walls of most Gram (+) bacterial species contain predominantly diacylated lipoprotein (Ac2LP) structures as these bacteria lack the N-acyl-transferase required to extend the third chain of the acylation pattern[12,13]. Pam2CSK4 and other diacylated lipoproteins have been shown to interact with TLRs 2 and 6[14]. The ability of bacterial pathogens to produce different acylated versions of lipoproteins contributes to their diversity and, hence, the challenges for their unique detection from a sensor design perspective.

TLR2 has been shown to interact with both di- and triacylated lipopeptides. Both in vivo and in vitro studies have revealed that TLR2 has the ability to heterodimerize with either TLR1 or TLR6 for the induction of a signaling pathway[12,14-17]. The establishment of the crystal structure of each of the TLR2-TLR6/1-'synthetic Ac2/3LP' complexes determined that the formation of fatty acid binding pockets, that are unique to the recognition of either Ac2LP or Ac3LP structures, is essential for innate bacterial differentiation[18, 19]. For this reason, the TLR1 and TLR2 pattern recognition receptors were chosen for further study and electrochemical biosensor application.

Triacylated lipopeptides consist of two ester-bound lipid chains and one amide-bound lipid chain; the presence of these lipid chains is the driving force behind the heterodimerization reaction between the two receptors[18]. The two ester-bound fatty acids insert themselves into a hydrophobic internal pocket of the TLR2 structure. This binding interaction is quite strong and is facilitated by further, primarily non-specific, hydrophobic interactions of TLR2 with the ester-bound head of the moiety. The interaction of the single amide-bound lipid chain of Ac3LP has more specific requirements as this fatty acid must be at least eight (8) carbons in length in order to induce the heterodimer formation to create the hydrophobic channel within TLR1. Once the Ac3LP has settled into the heterodimer, an intricate network of hydrogen-bonding and hydrophobic interactions form between the TLR1 and TLR2 proteins to further stabilize the complex[18,19]. Understanding this in vivo recognition mechanism between the toll-like receptors and their Gram (–) bacterial PAMPs will allow for the evaluation of the interactions that are taking place on the experimental sensor surfaces that have been fabricated for this study.

These experiments are an initial investigation into the effectiveness of using TLR1, TLR2 or a mixture of the two biorecognition elements, in a hybridized configuration, for the detection of its PAMP, Gram (–) bacterial triacylated lipoproteins. Binding responses were monitored and examined using complementary analytical and electrochemical techniques, including electrochemical impedance spectroscopy (EIS), cyclic voltammetry (CV) and quartz crystal microbalance (QCM). A label-free detection scheme was employed, as depicted in FIG. 13. Unlike electrochemical sensors using specific biorecognition elements to target a narrow group of bacterial or viral pathogens, TLRs are known to be non-specific regarding species or strain. Alternatively, TLRs are selective on a higher order in that they generically classify pathogens using pathogen associated molecular patterns (PAMPs) that are inherent, specific and repetitive to a pathogen structure regardless of species or strain. The simplicity of this sensor design approach makes it attractive for potential future exploitation in commercial sensor products.

Example 7

Experimental Method

Regents and preparation of electrodes are described in the supporting information.

Preparation of TLR1, TLR2 and 'TLR1 and 2' Sensors.

TLR sensors were prepared using fresh, cleaned gold electrodes. The electrodes were immersed in a 2 mM 1-lipoic acid n-hydroxysuccinimide ester (LPA) ethanol solution for 48 hours at 277 K. The electrodes were then rinsed thoroughly using absolute ethanol and blown dry under nitrogen before incubation in 200 μg/ml rmTLR1, 200 μg/ml rmTLR2 and 200 μg/ml 'rmTLR1 and 2' mixture for 72 hours at 277 K. The rmTLR1 and 2 mixture was prepared by mixing 200 μg/ml rmTLR1 and 200 μg/ml rmTLR2 with a volume ratio of 1:1. The final concentration of each component was 100 μg/ml and the total concentration of the combined TLR protein content was 200 μg/ml. Following the supplier's recommended conditions, all TLRs were prepared in PBS buffer (pH~7.4). The electrodes were rinsed with an excess volume of Milli-Q water and blown dry under nitrogen. An ethanolamine-tris buffer solution was prepared by dissolving 1.2 g of ethanolamine and 0.121 g of Tris base in 20 mL of water, the pH was adjusted to 8.4 using hydrochloric acid. TLR-immobilized electrodes were incubated in the ethanolamine solution for one hour at room temperature in order to block any remaining unreacted LPA amine sites. The fabricated sensors with immobilized, stand-alone rmTLR3, rmTLR4/MD-2 and rmTLR5, used for the selectivity test, were prepared using the same protocol described above.

TLR QCM measurement.

A rmTLR protein total surface coverage measurement was carried out using a CHI-440 quartz crystal microbalance (CH Instruments, Austin, Tex.). The quartz crystals have a fundamental frequency of 7.995 MHz. The QCM gold electrodes are modified by LPA using the same method described above. Each solution of rmTLR1, rmTLR2 and 'rmTLR1 and 2', respectively, in PBS buffer was injected into the cell prior to each unique measurement.

Exposure of Sensors to Pam3CSK4 Analyte.

Pam3CSK4 was dissolved in 10 mM HEPES aqueous buffer at pH~7.4. The blocked rmTLR biosensors were incubated in Pam3CSK4 at various concentrations for 20 minutes. The electrodes were always washed thoroughly with same HEPES buffer (pH~7.4) after the incubation.

Electrochemical Measurements.

All electrochemical measurements were carried out using a cell with a three-electrode configuration in an enclosed Faraday cage. CV and EIS measurements were completed using a CHI-660b potentiostat (CH Instruments, Austin, Tex.). rmTLR-modified gold electrodes and platinum (Pt) wire were used as the working electrode and the counter electrode, respectively. A reference electrode (Ag/AgCl/3.0M KCl) and a salt bridge, filled with an agar and 1M $KNO_3$ aqueous solution, were inserted to minimize the diffusion of chloride ions into the electrolyte solution. The agar solution was prepared by dissolving 2.0 grams of agar and 10.1 g KNOB in 100 mL of water. The CV and EIS electrolyte was made in a 10 mM HEPES aqueous buffer at pH~7.4, which consisted of a 5 mM $K_4Fe(CN)_6$/5 mM $K_3Fe(CN)_6$ as a redox couple with 1M of $NaClO_4$ as the supporting electrolyte. For consistency, the electrochemical measurements were carried out with open-circuit potentials. EIS experiments were conducted in the frequency range of 100,000 to 0.1 Hz with an amplitude of 5 mV. The experimental EIS curves were evaluated to determine the film resistance using ZSimpWin 2.0 software.

Discussion on Example 7

The preparation of each TLR sensor was uniquely characterized using CV and EIS with $Fe(CN)_6^{3-/4-}$ as a redox couple to monitor the veracity of the stepped fabrication. The CV in FIG. 14 shows that fresh regenerated Au electrodes have the highest oxidation and reduction current and the peaks are observed at 0.30 V and 0.23 V. The peak separation is approximately 68 mV. When the Au electrodes are modified with LPA, the redox peaks are suppressed from 0.06 mA to lower heights around 0.035 to 0.04 mA. This suppression indicates the formation of an LPA SAM and its subsequent blocking of electron transfer between the Au surface and redox couple as illustrated in FIG. 14d. The potential of the peaks shifted outward to express positions of more over-potential. As a result, the CV shows a much larger peak separation of 200 to 300 mV following the application of LPA to the sensor surface. The suppression of the current accessing the surface is furthered realized when TLR proteins are immobilized. The peaks flatten out and the maximum currents observed were approximately 0.03 mA. Unreacted LPA sites are blocked using ethanolamine to minimize non-TLR surface-fouling proteins from environment[20]. There is no significant difference observed by CV measurement in terms of either peak potential or height between this TLR-only and blocked TLR surfaces.

The film resistant (Rct) was measured using electrochemical impedance spectroscopy. Examples of Nyquist plots are shown in FIG. 15 for TLR1, TLR2 and 'TLR1 and 2'. The smallest arc shown in FIG. 15a belongs to the LPA SAMs. The size of the arc increases significantly when proteins of TLR1 are immobilized during the amine-coupling reaction. The impedance of the blocked TLR1 has also been recorded, which is slightly smaller than unblocked TLR1. It is speculated that during the blocking time, some non-specifically absorbed TLR1 are displaced by the blocking reagents. A similar trend is also observed for the TLR2 and 'TLR1 and 2' protein systems as shown in FIGS. 15b and c. All the impedance data were evaluated using the model identified in FIG. 15d. The film resistance (Rct) is obtained for three TLR systems and stages. Multiple samples were prepared and evaluated for statistic relevance.

The statistical plot in FIG. 16 shows that the LPA film has an Rct of 1638±1054 ohm·cm². The film resistance increases significantly after TLR1 is immobilized to 10310±150 ohm·cm². The blocked TLR1, which completed the biosensor sensor surface, has an Rct of 5823±439 ohm·cm². The film resistance following the surface modification with TLR2 shows less of a change than for TLR1 at 6511±1863 ohm·cm², although the blocked TLR2 biosensor surface is at comparable level to that of TLR1 at 5943±439 ohm·cm². The mixed 'TLR1 and 2' solution was prepared by using the equal volume mixing technique described above, resulting in a half volumetric concentration of each TLR at 100 µg/ml. The total concentration of the combined TLR1 and TLR2 protein was at 200 µg/ml. The film resistance for 'TLR1 and 2' was 7619±1400 ohm·cm², which is at the level between that of the pure TLR1 and TLR2 films. The Rct for the blocked 'TLR1 and 2' is estimated at 6176±1551 ohm·cm².

The coverage of the TLR proteins on the sensor surface was investigated using a QCM method. FIG. 17a shows the change of resonance frequency as a function of time after incubation of an LPA-modified QCM gold electrode with the TLR1 protein. The signal reaches plateau at 112 Hz. The frequency of the crystal decreased 137 Hz and 119 Hz for TLR2 and the 'TLR1 and 2' protein mixture respectively. The change of frequency is then converted to a surface mass change measurement using the Sauerbrey equation[21]:

$$\Delta f = -\frac{2f_0^2}{A\sqrt{\rho_q q_q}}\Delta m$$

where $\Delta f$ is the frequency change (Hz); $f_0$ is the fundamental resonant frequency for the crystal's being employed (=7.995 MHz for CHI crystal); A is area of the gold disk coated onto the crystal (0.196 cm²); $\rho_q$ is Density of quartz (=2.684 g·cm⁻³); $q_q$ is shear modulus of quartz (=2.947×10¹¹ g·cm⁻¹ s⁻²); $\Delta m$ is mass change (g).

The calculations for each TLR surface QCM measurement shows the coverage density of immobilized TLR1 and TLR2 are 763 ng/cm² and 937 ng/cm². The coverage density for the 'TLR1 and 2' mixture surface is 814 ng/cm²; a measurement which sits directly between the values for the TLR1 and TLR2 surfaces. The QCM data confirms that there is no increase for the total amount of TLR protein immobilized when a mixture is used.

Fabricated TLR1, TLR2 and 'TLR1 and 2' sensors were tested against Pam3CSK4, a synthetic triacylated lipopeptide, that mimics the triacylated amino terminus of a bacterial lipopeptide. Electrochemical impedance spectroscopy (EIS) measurements were taken across the TLR1 sensor both before and after it was exposed to varying concentrations of the Pam3CSK4 ligand, at 5 µM, 10 µM, 25 µM and 50 µM respectively. As shown in FIG. 18a, the smallest arc represented is for the TLR1 sensor prior to Pam3CSK4 exposure. The arc size increases with each subsequent exposure of the TLR1 surface to a increased Pam3CSK4 concentration. This increasing trend is also observed for the TLR2 and 'TLR1 and 2' sensor surfaces. This trend can be attributed to the binding of Pam3CSK4 to the TLR proteins. As immobilized TLR proteins on the sensor bind to more of the Pam3CSK4 ligands, the film resistance increases. Simulations were carried out using the model shown in FIG. 18d to evaluate the impedance data. The statistical plot has been constructed based on the exposures of each surface to the Pam3CSK4 calibration concentrations (FIG. 19). The detailed results of other variables from these simulations are shown in tables S1-S3.

The calibration curves obtained using the data collected for the Pam3CSK4 exposures to the TLR1, TLR2 and 'TLR1 and 2' sensor surfaces are shown in FIG. 18. The lowest concentration tested was 5 µM for all sensors. The hybrid sensor picked up responses of 37±11% at 5 µM (7.5 µg/ml). The responses observed at this concentration were not significant for TLR1 and TLR2 sensors and, it should be noted, detection became more reproducible at Pam3CSK4 concentrations greater than 10 µM (15.1 µg/ml). The responses are 21±7%, 32±6% and 47±17% for TLR1, TLR2 and 'TLR1 and 2' sensors respectively. TLR1 & 2 hybridized sensors demonstrate slightly higher Pam3CSK4 binding responses than the pure TLR1 and TLR2 sensors. The delta Rct % for TLR1 and TLR2 are 59±7% and 42±18% at 25 µM of the ligand respectively. The detection response from the 'TLR1 and 2' sensor at the same concentration is significantly higher at 125±19%. This trend is continued to the 50 µM concentration where the delta Rct % for the 'TLR1 and 2' sensor is 199±26%, while the values for standalone TLR1 and TLR2 sensors are 98±10% and 80±32%. The detection of Pam3CSK4 was previously reported using Toll-like receptor expressing cells and the detection was as low as 2 ug/ml[22]. Although the detection limit observed here with electrochemical 'TLR1 and 2' sensor is not as low as TLR cell assay, the preparation of the detection is significantly simpler with no cell culture required.

These experiments do not allow for a structural analysis of the complex formed at the hybridized sensor surface therefore we can only hypothesize, based on our understanding of the existing body of literature on the TLR-PAMP interactions and on supplemental control testing, as to why this sensor performs so much better. The QCM measurements prove that there is no additional TLR protein immobilized on the surface of the hybridized TLR sensor. The electrochemical measurements obtained on the control sensors with pure TLR1 and TLR2 prove that binding of the Pam3CSK4 does not occur in the absence of the heterodimer TLR. The binding affinity of this interaction is likely weaker and inefficient, as homodimerization would not occur and it is unknown how tightly bound the acyl groups would be to their respective binding patches on the TLR surface. For the hybridized sensor, it is speculated that although TLR1 and TLR2 do not dimerize in the absence of their Ac3LP ligand, a 'TLR1 and TLR2' mixture localized on same sensor surface would bind and work cooperatively upon exposure to the ligand. This leads to a more efficient interaction between the TLR proteins and ligand, likely resulting in improved binding affinity. Coincidentally, the conformational change that takes place during the 'TLR1 and TLR2' dimerization interaction with the Pam3CSK4, resulting in an 'm-shaped' horseshoe complex, may also result in the formation of a blocking layer at the sensor surface. This resulting film would prevent electron transfer, therefore enhancing the impedance response.

To further examine the TLR suite interactions through the exploitation of this electrochemical sensor fabrication technique and, taking our inspiration from nature, a PAMP selectivity test was carried out. For this test a suite of six TLRs was employed, including TLRs 1-5 as standalone biorecognition elements and the hybridized 'TLR 1 and 2' sensor surface. It must be noted that TLR3, TLR4/MD-2 and TLR5 will be activated by different PAMPs and generally form homodimers in vivo to activate an immunological response[5-9]. TLR3 is selective to double-stranded RNA, a form of genetic information carried by some viruses[5]. TLR4/MD-2 and TLR5 detect lipopolysaccharides[7-9] and flagellins[6] from bacteria, respectively. The results of the selectivity test are demonstrated in FIG. 20 Although TLR3, TLR4/MD-2 and TLR5 sensors, built in a similar fashion, show slight signal variations, the electrochemical responses observed from the TLR1 and TLR2 sensor surfaces are at much higher levels, approximately 20% and 30% higher, respectively. The highest response was observed from the hybrid 'TLR1 and 2' sensor at approximately 47%.

A hybridized sensor utilizing hybridized 'TLR1 and TLR2' as biorecognition elements have been successfully demonstrated in this work. A combination of analytical methods including CV, EIS and QCM were carried out in order to characterize the properties of the sensor surface inclusively from sensor fabrication through to the application and detection of the binding analytes. Individual TLR1 and TLR2 sensor surfaces were also manufactured as baseline comparisons for the hybridized sensor. Both of the electrochemical techniques employed, CV and EIS, find no significant difference in the electron transfer properties and film resistance between pure TLR and mixed TLR protein immobilizations. The recorded electrochemical signals for all three systems are also similar. These results are complemented by the QCM data, which observed the following levels of TLR immobilized proteins onto the gold surfaces, 763 ng/cm$^2$ (TLR1), 937 ng/cm$^2$ (TLR2) and 814 ng/cm$^2$ ('TLR1 and 2' mixture). The total surface coverage for the 'TLR1 and 2' protein mixture lies between that for the individual TLR1 and TLR2 when applied in a replicated fashion. All three sensors were tested against Pam3CSK4 at varying concentrations from 5 µM up to 50 µM. Pam3CSK4 is a synthetic lipopeptide that mimics the triacylated lipopeptides that are inherent primarily in Gram (−) bacteria. Although the limit of detection for the hybridized 'TLR1 and 2' sensor was found at 5 µM, while for TLR1 and TLR2 at 10 µM. The hybridized 'TLR1 and 2' sensor showed double the response as compared to the individual TLR1 and TLR2 systems. This is possibly due to the heterodimerization of toll-like receptors on the surface upon exposure to the PAMP whereby a blocking layer is formed by 'hybrid TLR'-PAM3CSK4 complex that increases the film resistance at the sensor surface.

Unlike electrochemical sensors using specific biorecognition elements to target a narrow group of bacterial or viral strains, such as antibody-based sensors, TLR sensors have a wide range of scope for detection. Based on an in-depth literature review, our understanding of the in vivo interaction between TLR1 and TLR2 and its PAMP, synthetic or otherwise, is that binding would be selectively induced by triacylated lipopeptides.

Supplemental Information

Electrochemical Detection of Pam3CSK4 Using a Hybridized 'Toll-Like Receptor 1 and 2' Sensor Reagents. Sodium hydroxide, hydrochloric acid (36.5%) and potassium nitrate were obtained from Caledon Laboratories Ltd. (Georgetown, ON). Sulfuric acid (98%), hydrogen peroxide (30%), phosphate buffered saline (PBS) buffer (pH~7.4), HEPES (99.5%), agar, sodium perchlorate and potassium ferricyanide were purchased from Sigma-Aldrich (Oakville, ON). Alumina powders (0.3 μm and 0.05 μm, respectively) were obtained from Allied High Tech Products Inc. Compton, Calif.). All solutions were prepared in deionized water (Millipore Milli-Q; 18 MΩ·cm resistivity). 1-Lipoic acid n-hydroxysuccinimide ester (LPA) was synthesized following a published protocol2[23]. Mouse TLR1 Recombinant (rm) Protein (RDS1476TR050) and Mouse TLR2 Fc Chimera Recombinant (rm) Protein (RDS1530TR050) were obtained from R&D Systems (Minneapolis, Minn.). Potassium ferrocyanide and Tris base (Ultrapure) were bought from EM Science (Billerica, Mass.) and United Chemical Services Inc. (Selkirk, MB) respectively. Ethanolamine (99%) and Pam3CSK4 (Invivogen TLRL-PMS) were purchased from Alfa-Aesar (Ward Hill, Mass.) and Cedarlane (Burlington, ON). CHI101 gold electrodes (2 mm in diameter) were obtained from CH Instrument (Austin, Tex.). All reagents were used as received with no further modification unless otherwise stated within the manuscript. Milli-Q water was used throughout this study for all purposes including electrochemistry processes, sample and buffer solutions.

Polishing, Preparation and Regeneration of Electrodes.

A piranha solution (must be handled with extreme care) was prepared by mixing a 3:1 volume ratio of concentrated sulfuric acid to hydrogen peroxide. The CHI101 gold electrodes were cleaned by direct immersion in the piranha solution for 20-30 seconds each. The electrodes were washed thoroughly with Milli-Q water before each electrode polished using slurries of 0.3 μm and 0.05 μm alumina powders at 3-minute intervals. The alumina suspension was then removed by ultrasonicating the electrodes for 10 minutes periods in Milli-Q water, absolute ethanol and Milli-Q water respectively. The electrodes were then electrochemically cleaned by running 100 cycles using a pre-programmed CV method; each electrode is first immersed in 0.5 M of aqueous sodium hydroxide solution and run between 0 V and 2 V at a scan rate of 0.5 V·s$^{-1}$. This is followed by exposing the electrodes to a second pre-programmed CV cleaning method of 100 cycles between 0 V and 1.5 V at the same scan rate while immersed in a 0.5 M aqueous sulfuric acid solution.

TABLE S1

Values of the equivalent circuit elements shown in FIG. 18 for label-free TLR1 sensor.

| | Rs ($\Omega \cdot cm^2$) | Capacitance (F/cm$^2$) | Rdl ($\Omega \cdot cm^2$) | CPE (F/s$^{0.5} \cdot cm^2$) | n | Rct ($\Omega \cdot cm^2$) | W ($\mu F^{0.5} cm^2$) |
|---|---|---|---|---|---|---|---|
| Before Immersion | 4.416 | 4.069E−9 | 38.32 | 1.205E−6 | 0.915 | 10250 | 1.788E−4 |
| After 5 μM Pam3CSK4 | 4.116 | 4.193E−9 | 37.91 | 1.338E−6 | 0.9004 | 10780 | 1.732E−4 |
| After 10 μM Pam3CSK4 | 3.327 | 3.901E−9 | 40.29 | 1.349E−6 | 0.8962 | 12760 | 1.329E−4 |
| After 25 μM Pam3CSK4 | 4.155 | 4.407E−9 | 40.22 | 1.339E−6 | 0.8887 | 16840 | 7.257E−5 |
| After 50 μM Pam3CSK4 | 4.919 | 4.816E−8 | 41.11 | 1.308E−6 | 0.8855 | 21010 | 5.092E−5 |

Table S1. Values of the Equivalent Circuit Elements Shown in FIG. 18 for Label-Free TLR1 Sensor.

TABLE S2

Values of the equivalent circuit elements shown in FIG. 18 for label-free TLR2 sensor.

| | Rs ($\Omega \cdot cm^2$) | Capacitance (F/cm$^2$) | Rdl ($\Omega \cdot cm^2$) | CPE (F/s$^{0.5} \cdot cm^2$) | n | Rct ($\Omega \cdot cm^2$) | W ($\mu F^{0.5} cm^2$) |
|---|---|---|---|---|---|---|---|
| Before Immersion | 2.893 | 4.200E−8 | 31.76 | 8.798E−7 | 0.9315 | 7784 | 2.648E−4 |
| After 5 μM Pam3CSK4 | 2.044 | 3.965E−8 | 31.9 | 8.937E−7 | 0.9275 | 7355 | 2.703E−4 |
| After 10 μM Pam3CSK4 | 1.747 | 3.690E−8 | 33.09 | 9.131E−7 | 0.9241 | 9446 | 1.910E−4 |
| After 25 μM Pam3CSK4 | 2.818 | 4.081E−8 | 33.26 | 8.204E−7 | 0.9268 | 12770 | 7.821E−5 |
| After 50 μM Pam3CSK4 | 3.132 | 4.109E−8 | 33.42 | 7.95E−7 | 0.924 | 17610 | 4.815E−5 |

Table S2. Values of the Equivalent Circuit Elements Shown in FIG. 18 for Label-Free TLR2 Sensor.

TABLE S3

Values of the equivalent circuit elements shown in FIG. 18 for label-free 'TLR1 and 2' sensor.

| | Rs ($\Omega \cdot cm^2$) | Capacitance ($F/cm^2$) | Rdl ($\Omega \cdot cm^2$) | CPE ($F/s^{0.5} \cdot cm^2$) | n | Rct ($\Omega \cdot cm^2$) | W ($\mu F^{0.5} cm^2$) |
|---|---|---|---|---|---|---|---|
| Before Immersion | 11.49 | 5.242E−8 | 46.34 | 7.299E−7 | 0.9685 | 5472 | 4.159E−4 |
| After 5 µM Pam3CSK4 | 1.002E−7 | 2.319E−8 | 38.44 | 9.315E−7 | 0.9413 | 5688 | 4.116E−4 |
| After 10 µM Pam3CSK4 | 4.441 | 1.253E−7 | 43.89 | 8.785E−7 | 0.9251 | 7147 | 3.345E−4 |
| After 25 µM Pam3CSK4 | 4.218 | 1.333E−7 | 50.96 | 8.385E−7 | 0.9211 | 11260 | 2.339E−4 |
| After 50 µM Pam3CSK4 | 3.805 | 8.774E−8 | 42.91 | 8.500E−7 | 0.9262 | 15620 | 1.537E−4 |

Table S3. Values of the Equivalent Circuit Elements Shown in FIG. 18 for Label-Free 'TLR1 and 2' Sensor.

REFERENCES (1) Janeway, C. A., Jr.; Medzhitov, R. *Annu. Rev. Immunol.* 2002, 20, 197.
(2) Akira, S.; Takeda, K.; Kaisho, T. *Nat. Immunol.* 2001, 2, 675.
(3) Kawai, T.; Akira, S. *Nat. Immunol.* 2010, 11, 373.
(4) Underhill, D. M.; Ozinsky, A. *Curr. Opin. Immunol.* 2002, 14, 103.
(5) Amini, K.; Chan, N. W. C.; Kraatz, H.-B. *Analytical Methods* 2014, 6, 3322.
(6) She, Z.; Topping, K.; Shamsi, M. H.; Wang, N.; Chan, N. W. C.; Kraatz, H.-B. *Anal. Chem.* 2015, 87, 4218.
(7) Amini, K.; Ebralidze, I.; Chan, N. W. C.; Kraatz, H.-B. *Anal. Methods* 2016, Ahead of Print.
(8) Yeo, T. Y.; Choi, J. S.; Lee, B. K.; Kim, B. S.; Yoon, H. I.; Lee, H. Y.; Cho, Y. W. *Biosens. Bioelectron.* 2011, 28, 139.
(9) Mayall, R. M.; Renaud-Young, M.; Chan, N. W. C.; Birss, V. I. *Biosens. Bioelectron.* 2017, 87, 794.
(10) Kang, J. Y.; Lee, J. O. In *Annu. Rev. Biochem.*; Kornberg, R. D., Raetz, C. R. H., Rothman, J. E., Thorner, J. W., Eds. 2011; Vol. 80, p 917.
(11) Invivogen http://www.invivogen.com/PDF/Pam3CSK4_TDS.pdf.
(12) Farhat, K.; Riekenberg, S.; Heine, H.; Debarry, J.; Lang, R.; Mages, J.; Buwitt-Beckmann, U.; Roeschmann, K.; Jung, G.; Wiesmueller, K.-H.; Ulmer, A. J. *J. Leukocyte Biol.* 2008, 83, 692.
(13) Robichon, C.; Vidal-Ingigliardi, D.; Pugsley, A. P. *J. Biol. Chem.* 2005, 280, 974.
(14) Schenk, M.; Belisle, J. T.; Modlin, R. L. *Immunity* 2009, 31, 847.
(15) Gautam, J. K.; Ashish; Comeau, L. D.; Krueger, J. K.; Smith, M. F., Jr. *J. Biol. Chem.* 2006, 281, 30132.
(16) Zahringer, U.; Lindner, B.; Inamura, S.; Heine, H.; Alexander, C. *Immunobiology* 2008, 213, 205.
(17) Buwitt-Beckmann, U.; Heine, H.; Wiesmueller, K.-H.; Jung, G.; Brock, R.; Akira, S.; Ulmer, A. J. *J. Biol. Chem.* 2006, 281, 9049.
(18) Jin, M. S.; Kim, S. E.; Heo, J. Y.; Lee, M. E.; Kim, H. M.; Paik, S.-G.; Lee, H.; Lee, J.-O. *Cell (Cambridge, Mass., U.S.)* 2007, 130, 1071.
(19) Kang, J. Y.; Nan, X.; Jin, M. S.; Youn, S.-J.; Ryu, Y. H.; Mah, S.; Han, S. H.; Lee, H.; Paik, S.-G.; Lee, J.-O. *Immunity* 2009, 31, 873.
(20) Tanious, F. A.; Nguyen, B.; Wilson, W. D. *Methods Cell Biol* 2008, 84, 53.
(21) Sauerbrey, G. *The Use of Quartz Crystal Oscillators for Weighing Thin Layers and for Microweighing Applications*, 1959.
(22) Huang, L.-Y.; Du Montelle, J. L.; Zolodz, M.; Deora, A.; Mozier, N. M.; Golding, B. *J. Clin. Microbiol.* 2009, 47, 3427.
(23) Howarth, M.; Liu, W. H.; Puthenveetil, S.; Zheng, Y.; Marshall, L. F.; Schmidt, M. M.; Wittrup, K. D.; Bawendi, M. G.; Ting, A. Y. *Nat. Methods* 2008, 5, 397.

The invention claimed is:

1. A substrate for the detection of a biological target by Scanning Electrochemical Microscopy (SECM), comprising:
    a conductive surface;
    a probe area provided on the conductive surface, the probe area comprising receptors responsive to the biological target; and
    a background area provided on the conductive surface, the background area being disposed around the probe area and comprising electroactive compounds providing imaging contrast between the background area and the probe area.

2. The substrate of claim 1, wherein the conductive surface is a gold surface or a carbon surface.

3. The substrate of claim 1, wherein the electroactive compounds comprise a metal complex.

4. The substrate of claim 3, wherein the sandwich metal complex is a metallocene.

5. The substrate of claim 1, wherein the electroactive compounds are provided on the background area at a surface density between 1 molecule/nm$^2$ to 10 molecules/nm$^2$.

6. The substrate of claim 1, further comprising a linker layer provided on the conductive surface, wherein:
    the linker layer connects the receptors to the conductive surface in the probe area, and
    the linker layer connects the electroactive compounds to the conductive surface in the background area.

7. The substrate of claim 6, wherein the linker layer is made of linkers comprising:
    a substrate moiety bound to the conductive surface, and
    a ligand attachment moiety bound to the receptors or the electroactive compounds.

8. The substrate of claim 7, wherein the substrate moiety comprises a functional group selected from the group consisting of a thiol, a sulfide and a disulfide.

9. The substrate of claim 7, further comprising a blocker compound for blocking unreacted ligand attachment moieties.

10. The substrate of claim 1, wherein the receptors comprise at least one type of Toll-like receptors (TLRs).

11. The substrate of claim 10, wherein the receptors comprise heterodimers of TLR receptors.

12. The substrate of claim 1, wherein the probe area comprises a plurality of spots, each of the spots being at least partially surrounded by the background area.

13. A biosensor for detecting a biological target by SECM, comprising the substrate as defined in claim 1, and an electrode for applying a potential to the probe area and the background area.

14. The method of claim 1, wherein the electroactive compounds comprise a metal complex.

15. The method of claim 14, wherein the sandwich metal complex is a metallocene.

16. A method for manufacturing a substrate for conducting SECM measurements, the method comprising:
    providing a conductive surface;
    attaching receptors to a first area of the conductive surface to obtain a probe area, the receptors being responsive to a biological target; and
    attaching electroactive compounds to a second area of the conductive surface located around the first area to obtain a background area, the electroactive compounds providing imaging contrast between the background area and the probe area.

17. The method of claim 16, wherein the conductive surface is a gold surface or a carbon surface.

18. The method of claim 16, wherein the electroactive compounds are attached to the second area at a surface density between 1 molecule/nm$^2$ to 10 molecules/nm$^2$.

19. The method of claim 16, further comprising binding linkers to the conductive surface to obtain a linker layer, wherein:
    attaching the receptors to the first area of the conductive surface comprises binding the receptors to the linker layer; and
    attaching the electroactive compounds to the second area of the conductive surface comprises binding the electroactive compounds to the linker layer.

20. The method of claim 19, wherein binding the linkers to the conductive surface comprises:
    binding a substrate moiety of the linkers to the conductive surface; and
    binding a ligand attachment moiety of the linkers to the receptors in the first area, and to the electroactive compounds in the second area.

21. The method of claim 20, wherein the substrate moiety comprises a sulfur-bearing functional group selected from the group consisting of a thiol, a sulfide and a disulfide.

22. The method of claim 20, further comprising binding a blocker compound to unreacted ligand attachment moieties to block the unreacted ligand attachment moieties.

23. The method of claim 16, wherein the receptors comprise at least one type of Toll-like receptors (TLRs).

24. The method of claim 16, wherein the probe area comprises a plurality of spots, each of the spots being at least partially surrounded by the background area.

* * * * *